United States Patent
Fisher

(10) Patent No.: US 12,145,787 B2
(45) Date of Patent: Nov. 19, 2024

(54) EXPANDABLE FOAM CORNER PROTECTOR

(71) Applicant: Hickory Springs Manufacturing Company, Hickory, NC (US)

(72) Inventor: Samantha Fisher, Hickory, NC (US)

(73) Assignee: HICKORY SPRINGS MANUFACTURING COMPANY, Hickory, NC (US)

( * ) Notice: Subject to any disclaimer, the term of this patent is extended or adjusted under 35 U.S.C. 154(b) by 35 days.

(21) Appl. No.: 18/131,051

(22) Filed: Apr. 5, 2023

(65) Prior Publication Data

US 2023/0312215 A1 Oct. 5, 2023

Related U.S. Application Data

(60) Provisional application No. 63/327,473, filed on Apr. 5, 2022.

(51) Int. Cl.

| | |
|---|---|
| *B65D 81/05* | (2006.01) |
| *B29C 48/00* | (2019.01) |
| *B29C 48/12* | (2019.01) |
| *B65B 55/00* | (2006.01) |
| *B29K 105/04* | (2006.01) |
| *B29L 31/00* | (2006.01) |

(52) U.S. Cl.
CPC ........ *B65D 81/057* (2013.01); *B29C 48/0022* (2019.02); *B29C 48/12* (2019.02); *B65B 55/00* (2013.01); *B29K 2105/04* (2013.01); *B29L 2031/003* (2013.01); *B65D 2581/055* (2013.01)

(58) Field of Classification Search
CPC .............. B29K 2105/04; B65D 81/053; B65D 81/054; B65D 81/055; B65D 81/056; B65D 81/057; B65D 81/058; B29C 48/0022

USPC ......................................... 206/453, 586, 523
See application file for complete search history.

(56) References Cited

U.S. PATENT DOCUMENTS

| | | |
|---|---|---|
| 3,994,433 A | 11/1976 | Jenkins et al. |
| 5,705,252 A | 1/1998 | Lea et al. |
| 6,284,346 B1 | 9/2001 | Sheridan |
| 6,564,938 B1 * | 5/2003 | Thompson ........... B65D 81/127 206/320 |

(Continued)

OTHER PUBLICATIONS http://www.technifoam.com/design-photo-gallery/polyethylene-gallery/.

*Primary Examiner* — Jacob K Ackun
(74) *Attorney, Agent, or Firm* — BURR & FORMAN LLP

(57) ABSTRACT

An expandable foam corner protector is provided. The expandable foam corner protector includes (i) a first L-shaped bracketing portion; (ii) a second L-shaped bracketing portion; and (iii) an interior channel portion, which is located between the bracketing portions, including a plurality of arc-shaped cuts extending through a thickness in a Z-direction of the interior channel portion. At least a portion of the arc-shaped cuts are aligned along a X-direction and are free to expand to form expanded openings along a Y-direction in response to an external force applied to the interior channel portion along the Y-direction. The interior channel portion is configured to define a generally right angle configured to overlie a corner of an inanimate object, and wherein the first L-shaped bracketing portion, the second L-shaped bracketing portion, and the interior portion define a U-shaped channel including the generally right angle of the interior channel portion.

20 Claims, 16 Drawing Sheets

(56) References Cited

U.S. PATENT DOCUMENTS

| | | | |
|---|---|---|---|
| 6,840,372 B2 * | 1/2005 | Giles | B65D 81/361 |
| | | | 52/173.1 |
| 7,654,391 B2 | 2/2010 | Langer et al. | |
| 7,913,896 B2 | 3/2011 | Reinkensmeyer | |
| 8,084,117 B2 | 12/2011 | Lalvani | |
| 8,486,507 B2 | 7/2013 | De Luca et al. | |
| 8,752,707 B2 * | 6/2014 | McDonald | B65D 81/057 |
| | | | 53/472 |
| 8,978,891 B2 * | 3/2015 | Mitsuhashi | B65D 81/057 |
| | | | 206/453 |
| 9,352,531 B2 | 5/2016 | Berns et al. | |
| 9,409,375 B2 | 8/2016 | Abrahams | |
| 10,369,061 B2 | 8/2019 | Jonegren et al. | |
| 2007/0062638 A1 | 3/2007 | Carroll | |
| 2009/0071861 A1 * | 3/2009 | Wang | B65D 81/113 |
| | | | 206/523 |
| 2011/0186473 A1 * | 8/2011 | Rockwell | B65D 81/03 |
| | | | 53/473 |
| 2012/0284928 A1 | 11/2012 | Henderson et al. | |
| 2016/0214344 A1 | 7/2016 | Abrahams | |

* cited by examiner

EXPANDABLE FOAM CORNER PROTECTOR

CROSS-REFERENCE TO RELATED APPLICATIONS

This application claims priority to U.S. Provisional Application No. 63/327,473, filed Apr. 5, 2022, which is expressly incorporated by reference herein in its entirety.

TECHNICAL FIELD

Embodiments of the presently-disclosed invention relate generally to expandable foam corner protectors manufactured, for example, with a pre-formed U-shaped channel and/or profile (e.g., from a single contiguous foam material), in which these expandable foam corner protectors may be extruded as a single piece that may include one or more sets of perforations (e.g., die cuts) that define a plurality of separate expandable foam corner protectors that may be separated from one another via the one or more perforations and/or one or more pre-notched-out sections which may be removed from the expandable foam corner protector. Embodiments of the presently-disclosed invention also relate to an expandable foam plank that is transformable into an expandable foam corner protector, in which the expandable foam plank and the expandable foam corner protector are biased towards an unexpanded state. The expandable foam plank and expandable foam corner protector (e.g., either transformed from the expandable foam plank or the expandable foam corner protector having a pre-formed U-shaped channel and/or profile) each include an interior channel portion comprising a plurality of arc-shaped cuts that enable expansion upon application of an external force and contraction of the interior channel portion to an unexpanded state when no external force is applied thereto.

BACKGROUND

Foam corner protectors for packaging are typically produced from die-cut planks, injection molded, or extruded. Adjustable corner protectors for packaging may generally comprise a foam plank in which a pre-cut width or widths are removed to allow for varying dimensions. Once the desired width is achieved, the plank is folded and positioned over the corner to be protected. One downside of such designs is that the increments of expansion are preset. In this regard, the corner protector only securely fits a select few number of corner widths in a snug fashion. Such designs also tend to fail to provide adequate protection to the actual corner since the corner is not physically covered by the corner protector.

Another design for adjustable corner protectors utilizes particular set of cuts and locking arms that lock into a preset width upon being expanded. Such designs, however, also have the downside of merely providing increments of expansion that are preset. Additionally, such designs fail to provide an compressive force on the object being provided as the width is preset. Such designs, for instance, require an external force to overcome the locked-in width and to collapse the width of the corner protector inwardly towards the object to be protected.

In this regard, there remains a need in the art for a corner packaging solution that provides a nearly unlimited number of widths between a fully expanded state and an unexpanded state, while also being continually biased towards the unexpanded state.

SUMMARY

One or more embodiments of the invention may address one or more of the aforementioned problems. In accordance with certain embodiments, the invention provides an expandable foam plank comprising a top edge and a bottom edge opposing the top edge, in which a first distance between the top edge and the bottom edge defines a width of the expandable foam plank in a Y-direction in an unexpanded state. The expandable foam plank also comprises a first side edge and a second side edge opposing the first side edge, in which a second distance between the first side edge and the second side edge defines a length of the expandable foam plank in a X-direction. The expandable foam plank further comprises a first surface and a second surface opposing the first surface, in which a third distance between the first surface and the second surface defines a thickness of the expandable foam plank in a Z-direction in the unexpanded state. Additionally, the expandable foam plank comprises an interior channel portion extending from the first side edge to the second side edge, in which the interior channel portion includes a plurality of arc-shaped cuts extending through the thickness of the expandable foam plank, and wherein at least a portion (e.g., all or a majority thereof) of the arc-shaped cuts are aligned along the X-direction and are free to expand to form expanded openings along the Y-direction in response to an external force applied to the expandable foam plank along the Y-direction. The expandable foam plank may also include a first bracketing portion extending from the first side edge to the second side edge, and a second bracketing portion extending from the first side edge to the second side edge, in which the interior channel portion is located between the first bracketing portion and the second bracketing portion. In accordance with certain embodiments of the invention, the expandable foam plank is biased towards the unexpanded state.

In another aspect, the present invention provides an expandable foam corner protector comprising an expandable foam plank as described and disclosed herein. In accordance with certain embodiments of the invention, the first bracketing portion and the second bracketing portion may each be positioned generally perpendicular to the interior channel portion, and wherein the interior channel portion is free to expand in the Y-direction (e.g., via the plurality of arc-shaped cuts) from an unexpanded state in response to an external force applied to the interior channel portion in the Y-direction. In accordance with certain embodiments of the invention, the interior channel portion may be configured (e.g., folded) to define a generally right angle configured to overlie a corner of an inanimate object. The first bracketing portion and the second bracketing portion, in accordance with certain embodiments of the invention, may each be configured (e.g., folded) into each other and interlocked via respective male components and female components of notched-out portions to define opposing side walls configured to directly or indirectly overlie opposing side surfaces associated with a corner of the inanimate object. In accordance with certain embodiments of the invention, the expandable foam corner protector may be biased (e.g., continually biased) towards the unexpanded state in the Y-direction and exert a compressive force in the Y-direction on the inanimate object housed therein.

In another aspect, the present invention provides an expandable foam corner protector manufactured with a pre-formed U-shaped channel and/or profile (e.g., from a single contiguous foam material). In this regard, the expandable foam corner protectors manufactured with a pre-formed U-shaped channel and/or profile may be extruded as a single piece that may include one or more sets of perforations (e.g., die cuts) that define a plurality of separate expandable foam corner protectors that may be separated from one another via the one or more perforations and/or one or more pre-notched-out sections. The expandable foam corner protector includes an interior channel portion comprising a plurality of arc-shaped cuts that enable expansion upon application of an external force and contraction of the interior channel portion to an unexpanded state when no external force is applied thereto. In accordance with certain embodiments of the invention, the expandable foam corner protector manufactured with a pre-formed U-shaped channel and/or profile may include a first bracketing portion and a second bracketing portion, in which the interior channel portion is located between the first bracketing portion and the second bracketing portion. In accordance with certain embodiments of the invention, the first bracketing portion and the second bracketing portion may each be positioned generally perpendicular to the interior channel portion, and wherein the interior channel portion is free to expand in a Y-direction (e.g., via the plurality of arc-shaped cuts) from an unexpanded state in response to an external force applied to the interior channel portion in the Y-direction. In this regard, the first bracketing portion and the second bracketing portion may define opposing side walls to complete the U-shaped channel profile. In accordance with certain embodiments of the invention, the interior channel portion may be configured (e.g., folded) to define a generally right angle configured to overlie a corner of an inanimate object. The first bracketing portion and the second bracketing portion, in accordance with certain embodiments of the invention, may each be configured (e.g., folded) into each other and interlocked via respective male components and female components of notched-out portions to define opposing side walls configured to directly or indirectly overlie opposing side surfaces associated with a corner of the inanimate object. In accordance with certain embodiments of the invention, the expandable foam corner protector may be biased (e.g., continually biased) towards the unexpanded state in the Y-direction and exert a compressive force in the Y-direction on the inanimate object housed therein.

In another aspect, the present invention provides an expandable foam corner protector comprising a first L-shaped bracketing portion that may correspond to the first bracketing portion as disclosed and described herein in accordance with certain embodiments of the invention, a second L-shaped bracketing portion that may correspond to the second bracketing portion as disclosed and described herein in accordance with certain embodiments of the invention, and an interior channel as disclosed and described herein in accordance with certain embodiments of the invention. The interior channel portion may be located between the first L-shaped bracketing portion and the second L-shaped bracketing portion. Additionally or alternatively, the interior channel portion may include a plurality of arc-shaped cuts extending through a thickness in a Z-direction of the interior channel portion, and wherein at least a portion (e.g., all or a majority thereof) of the arc-shaped cuts are aligned along a X-direction and are free to expand to form expanded openings along a Y-direction in response to an external force applied to the expandable foam plank along the Y-direction. In accordance with certain embodiments of the invention, the first L-shaped bracketing portion and the second L-shaped bracketing portion may each be positioned generally perpendicular to the interior channel portion, and wherein the interior channel portion is free to expand in the Y-direction (e.g., via the plurality of arc-shaped cuts) from an unexpanded state in response to an external force applied to the interior channel portion in the Y-direction. In accordance with certain embodiments of the invention, the interior channel portion may be configured to define a generally right angle configured to overlie a corner of an inanimate object. The first L-shaped bracketing portion and the second L-shaped bracketing portion, in accordance with certain embodiments of the invention, may each be formed from a contiguous portion of foam (e.g., devoid of male and female interlocking features) or formed by folding corresponding male components and female components as disclosed and described herein. In accordance with certain embodiments of the invention, the expandable foam corner protector may be biased (e.g., continually biased) towards the unexpanded state in the Y-direction and exert a compressive force in the Y-direction on the inanimate object housed therein. Additionally or alternatively, the interior channel portion, the first L-shaped bracketing portion, and the second L-shaped bracketing portion may be formed from the same foam composition. Additionally or alternatively, the interior channel portion may be formed from a first foam composition and at least one (or both) of the L-shaped bracketing portions may be formed from a second foam composition. In accordance with certain embodiments of the invention, the expandable foam corner protector has a pre-formed U-shaped channel profile defined by the L-shaped bracket portions and the interior channel portion.

In yet another aspect, the present invention provides a method of forming an expandable foam plank. In accordance with certain embodiments of the invention, the method may comprise the following steps: (i) forming a foamable polymeric composition; (ii) extruding the foamable polymeric composition into the form of a plank having (a) a top edge and a bottom edge opposing the top edge that defines a width of the expandable foam plane in a Y-direction in an unexpanded state, (b) a first side edge and a second side edge opposing the first side edge that defines a length of the expandable foam plane in a X-direction in the unexpanded state, and (c) a first surface and a second surface opposing the first surface that defines a thickness of the expandable foam plank in a Z-direction in the unexpanded state; (iii) defining an interior channel portion extending from the first side edge to the second side edge and imparting a plurality of arc-shaped cuts extending through the thickness of the expandable foam plank in the interior channel portion, in which at least a portion (e.g., all or a majority thereof) of the arc-shaped cuts are aligned along the X-direction and being free to expand to form expanded openings along the Y-direction in response to an external force applied to the expandable foam plank along the Y-direction; (iv) defining a first bracketing portion extending from the first side edge to the second side edge, and defining a second bracketing portion extending from the first side edge to the second side edge, wherein the interior channel portion is located between the first bracketing portion and the second bracketing portion; and (v) forming a one or more pre-notched-out sections each defined by imparting corresponding individual perforation networks defining respective pre-notched-out sections in each of the first bracketing portion and the second bracketing portion, wherein the pre-notched out sections are removable to define corresponding notched-out portions. In accordance with certain embodiments of the invention, the expandable foam plank is biased towards the unexpanded state.

In yet another aspect, the present invention provides a method of forming an expandable foam corner protector manufactured with a pre-formed U-shaped channel and/or profile (e.g., from a single contiguous foam material). In accordance with certain embodiments of the invention, the method may comprise the following steps: (i) forming a foamable polymeric composition; (ii) extruding the foamable polymeric composition into the form of a U-shaped channel and/or profile including (a) an interior channel portion, (b) a first bracketing portion generally perpendicular to the interior channel portion; and (c) a second bracketing portion interior channel portion; (iii) imparting a plurality of arc-shaped cuts into and/or through the interior channel portion, such as described and disclosed herein, that enable expansion upon application of an external force and contraction of the interior channel portion to an unexpanded state when no external force is applied thereto; (iv) optionally imparting a plurality of first perforations defining a plurality of individual expandable foam corner protectors separable from each other via the plurality of first perforations; and (v) optionally imparting a plurality of second perforations defining one or more pre-notched-out sections in the first bracketing portion and/or the second bracketing portion. In accordance with certain embodiments of the invention, the interior channel portion is located between the first bracketing portion and the second bracketing portion. In accordance with certain embodiments of the invention, the first bracketing portion and the second bracketing portion may each be positioned generally perpendicular to the interior channel portion, and wherein the interior channel portion is free to expand in a Y-direction (e.g., via the plurality of arc-shaped cuts) from an unexpanded state in response to an external force applied to the interior channel portion in the Y-direction. In this regard, the first bracketing portion and the second bracketing portion may define opposing side walls to complete the U-shaped channel and/or profile. In accordance with certain embodiments of the invention, the expandable foam plank is biased (e.g., continually biased) towards the unexpanded state in the Y-direction and exert a compressive force in the Y-direction on the inanimate object housed therein.

In yet another aspect, the present invention provides a method of forming an expandable foam corner protector comprising a first L-shaped bracketing portion that may correspond to the first bracketing portion as disclosed and described herein in accordance with certain embodiments of the invention, a second L-shaped bracketing portion that may correspond to the second bracketing portion as disclosed and described herein in accordance with certain embodiments of the invention, and an interior channel as disclosed and described herein in accordance with certain embodiments of the invention. The method may comprises separately extruding a foamable polymeric composition into the form of the first L-shaped bracketing portion (or a first bracketing portion configured to be folded into itself and interlocked into a L-shaped configuration), the second L-shaped bracketing portion (or a first bracketing portion configured to be folded into itself and interlocked into a L-shaped configuration), and/or the interior channel portion. In accordance with certain embodiments of the invention, the L-shaped bracketing portions (or bracketing portions configured to be folded into themselves and interlocked into respective L-shaped configurations), and the interior channel portion by be formed from the same foamable polymeric composition. Alternatively, the interior channel portion may be formed from a first foamable polymeric composition and at least one (or both) of the L-shaped bracketing portions (or bracketing portions configured to be folded into themselves and interlocked into respective L-shaped configurations) may be formed from a second foamable polymeric composition. The method may also include a step of imparting a plurality of arc-shaped cuts extending through a thickness of the interior channel portion, in which at least a portion (e.g., all or a majority thereof) of the arc-shaped cuts are aligned along a X-direction and being free to expand to form expanded openings along a Y-direction in response to an external force applied to the expandable foam plank along the Y-direction. The method may also comprises bonding (e.g., adhesively) the interior channel portion to each of the L-shaped bracketing portions (or bracketing portions configured to be folded into themselves and interlocked into respective L-shaped configurations), such that (i) the interior channel portion is located between the L-shaped bracketing portions (or bracketing portions configured to be folded into themselves and interlocked into respective L-shaped configurations), (ii) the first L-shaped bracketing portion (or a first bracketing portion configured to be folded into itself and interlocked into a L-shaped configuration) and the second L-shaped bracketing portion (or a second bracketing portion configured to be folded into itself and interlocked into a L-shaped configuration) may each be positioned generally perpendicular to the interior channel portion, and (iii) the interior channel portion may be configured to define a generally right angle configured to overlie a corner of an inanimate object. In accordance with certain embodiments of the invention, the expandable foam corner protector may be biased (e.g., continually biased) towards the unexpanded state in the Y-direction and exert a compressive force in the Y-direction on the inanimate object housed therein. Alternatively, the L-shaped bracketing portions (or bracketing portions configured to be folded into themselves and interlocked into respective L-shaped configurations) may be formed contiguously with the interior channel portion to provide, for example, a pre-formed U-shaped profile.

In yet another aspect, the present invention provides a method of protecting a corner of an inanimate object. The method may include the following steps: (i) providing an expandable foam plank as described and disclosed herein; (ii) folding the first bracketing portion and the second bracketing portion to a position generally perpendicular to the interior channel portion; (iii) interlocking the first bracketing portion to itself via a first notched out section to define a first side wall, and interlocking the second bracketing portion to itself via a second notched out section to define a second side wall; (iv) folding the interior channel portion to define a generally right angle configured to overlie a corner of the inanimate object, in which steps (i)-(iv) form an expandable foam corner protector as described and disclosed herein; (v) expanding the interior channel portion to an expanded state; (vi) inserting the corner of the inanimate object into the expandable foam corner protector; and (vii) allowing the first side wall and the second side wall to clamp onto opposing side surfaces of the inanimate object.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

Figure 16:
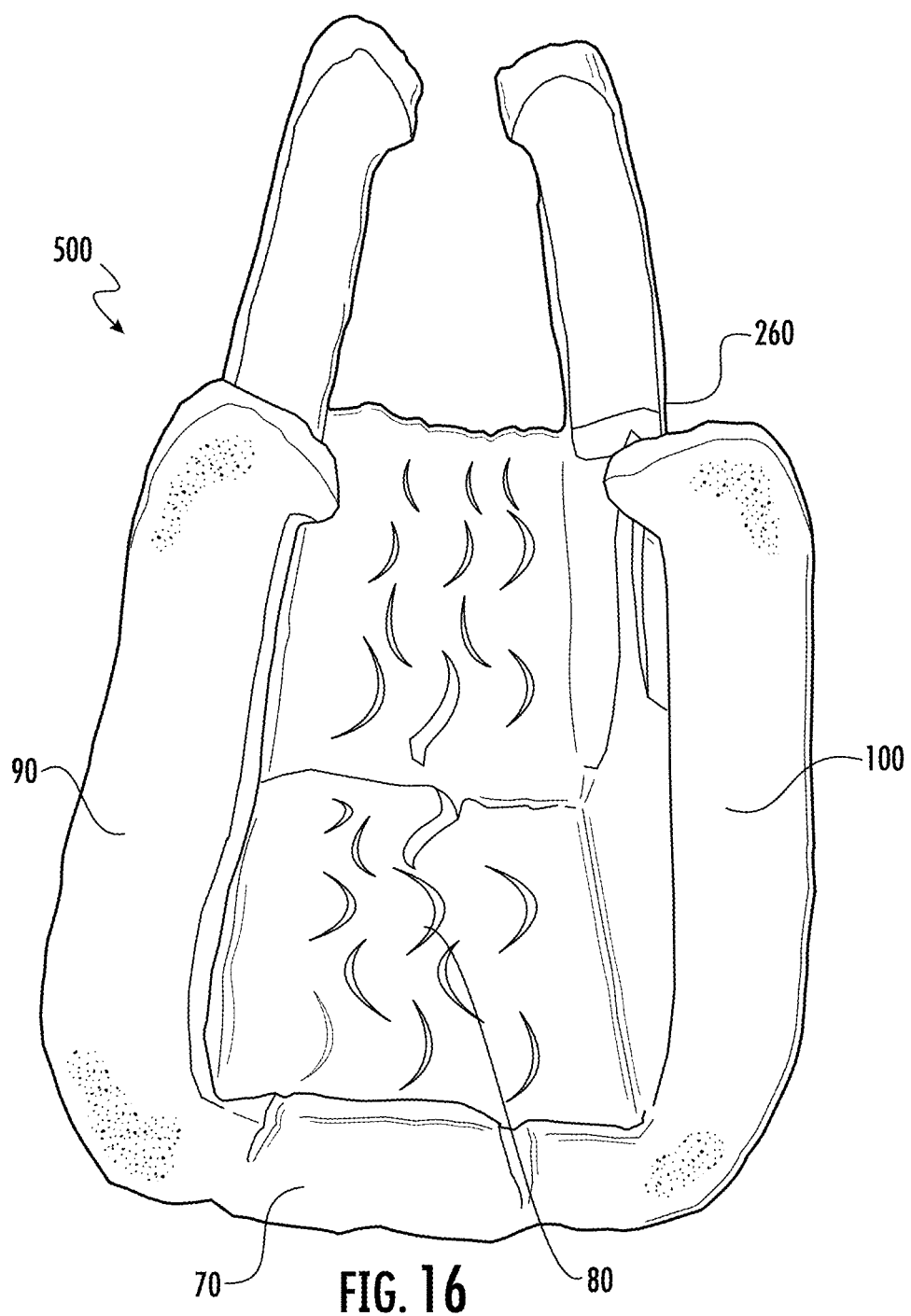
Figure 17:
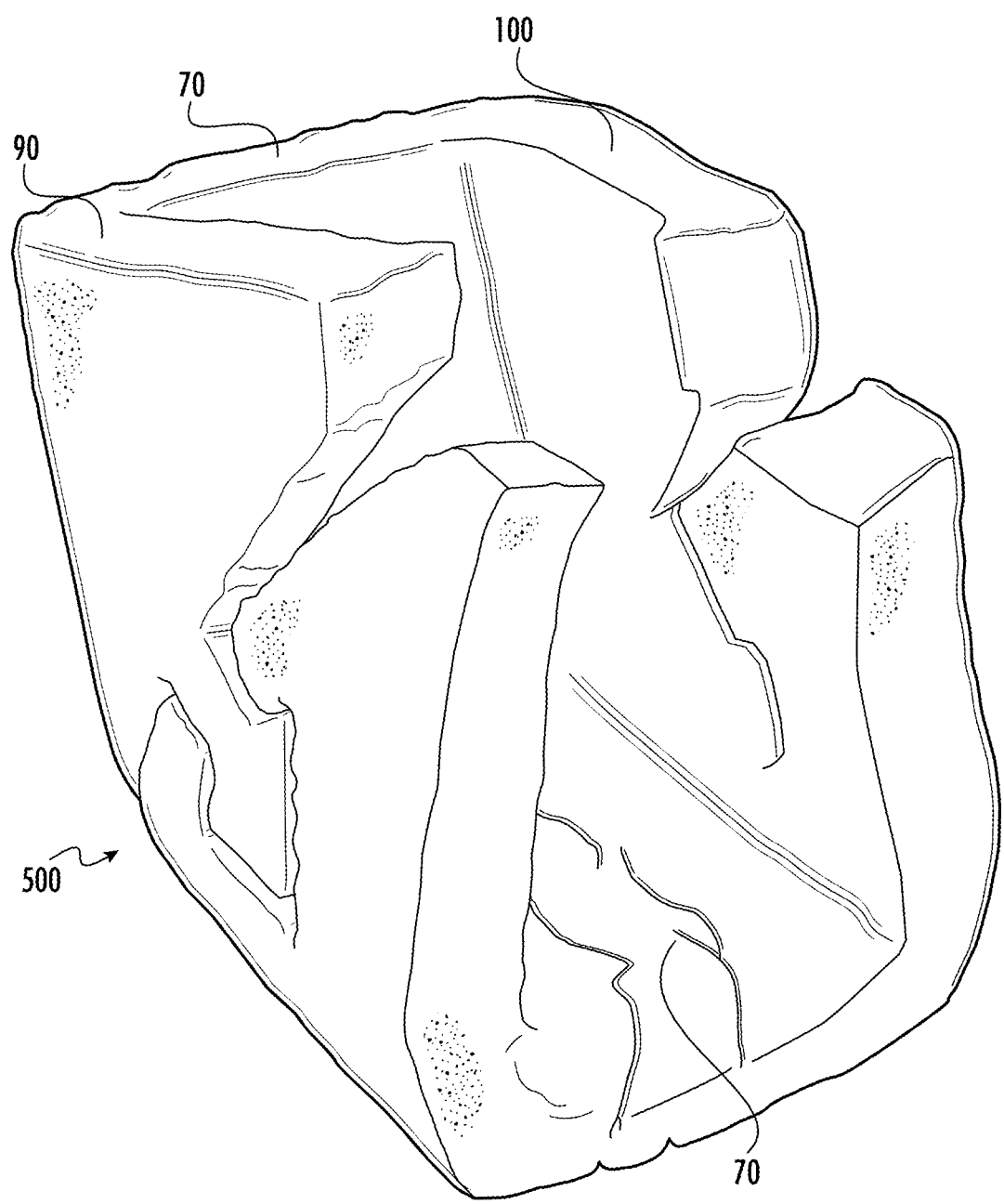

FIG. 16 illustrates an end view of an expandable foam corner protector manufactured with a pre-formed U-shaped channel and/or profile (e.g., from a single contiguous foam material) in accordance with certain embodiments of the invention; and FIG. 17 illustrates the expandable foam corner protector of FIG. 16 in which the first and second bracketing portions are interlocked in accordance with certain embodiments of the invention.

DETAILED DESCRIPTION

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The presently-disclosed invention relates generally to expandable foam planks that may be configured into an expandable foam corner protector and to expandable foam corner protectors manufactured with a pre-formed U-shaped channel and/or profile (e.g., from a single contiguous foam material), in which these expandable foam corner protectors may be extruded as a single piece. For example, the expandable foam plank be produced or provided as a generally planar foam plank and the expandable foam corner protectors manufactured with a pre-formed U-shaped channel and/or profile may each have an interior channel portion having a plurality of arc-shaped cuts that allow the internal channel and therefore the expandable foam plank to expand in a first direction due to an external force applied thereto. In this regard, the expandable foam plank and the expandable foam corner protectors manufactured with a pre-formed U-shaped channel and/or profile may be present in a unexpanded state in the absence of an external force that pushes and/or pulls the expandable foam plank or the expandable foam corner protectors manufactured with a pre-formed U-shaped channel and/or profile into an expanded state. In an expanded stated, for instance, the plurality of arc-shaped cuts, which enable the expansion of the expandable foam plank and the expandable foam corner protectors manufactured with a pre-formed U-shaped channel and/or profile, form expanded openings. For example, the plurality of arc-shaped cuts in the unexpandedstate may be embodied as thin slices or cuts that each provide a generally negligible aperture through the interior channel. As the expandable foam plank or the expandable foam corner protectors manufactured with a pre-formed U-shaped channel and/or profile is manipulated and/or held into an expanded state the plurality of arc-shaped cuts open up to form expanded openings that may define apertures of noticeably larger apertures than that of the unexpanded arc-shaped cuts. In accordance with certain embodiments, the expandable foam plank may be re-configured (e.g., folded) into an expandable foam corner protector. In this regard, the interior channel (e.g., in either the expandable foam plank or the expandable foam corner protectors manufactured with a pre-formed U-shaped channel and/or profile) may be sandwiched between a first bracketing portion and a second bracketing portion, in which the first and second bracketing portions may be oriented in a position that is generally perpendicular to the interior channel portion. Additionally, the first and second bracketing portions may each be folded into each other and locked into position (e.g., via a first male component engaged and held within a first female portion of the first bracketing portion and a second male component engaged and held within a second female portion of the second bracketing portion) to form side walls of the expandable foam corner protector. In this regard, the interior channel portion, the first bracketing portion, and a second bracketing portion may define a pocket or sleeve having generally configured to overlie a corner of an inanimate object (e.g., a corner of a flat screen television or box housing the same). For example, the expandable foam corner protector may substantially or completely overlie the corner of an inanimate object. In accordance with certain embodiments, the expandable foam corner protector may be in a unexpanded-state in the absence of an external force that pushes and/or pulls the expandable foam corner protector into an expanded state (e.g., at least some of the arc-shaped cuts have at least partially opened up to form expanded openings). In the unexpanded-state, the first bracketing portion and the second bracketing portion may be generally parallel to each other and separated by a first gap between the two, while in an expanded state the first bracketing portion and the second bracketing portion may be generally parallel to each other and separated by a second gap between the two that is larger than the first gap due to the formation of the expanded openings in the internal channel portion. In accordance with certain embodiments, the expandable foam corner protector is continuously biased towards the unexpanded-state. Additionally or alternatively, the expandable foam corner protector may be devoid of any portions that form and/or enable the formation of any expanded states that are "locked-in", in which an external force is required to collapse or move the expandable foam corner protector towards or into the unexpanded-state. Additionally or alternatively, the expandable foam plank and/or the expandable foam corner protector may be expanded into multiple incrementally different expanded states. For example, the degrees of expansion of the expandable foam plank and/or the expandable foam corner protector are not governed or limited to stepwise increases in degrees of expansion.

The terms "substantial" or "substantially" may encompass the whole amount as specified, according to certain embodiments of the invention, or largely but not the whole amount specified (e.g., 95%, 96%, 97%, 98%, or 99% of the whole amount specified) according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system. The term "polymer" or "polymeric" shall also include, in according to certain embodiments of the invention, polymers produced by fermentation process or biosourced.

Figure 1:
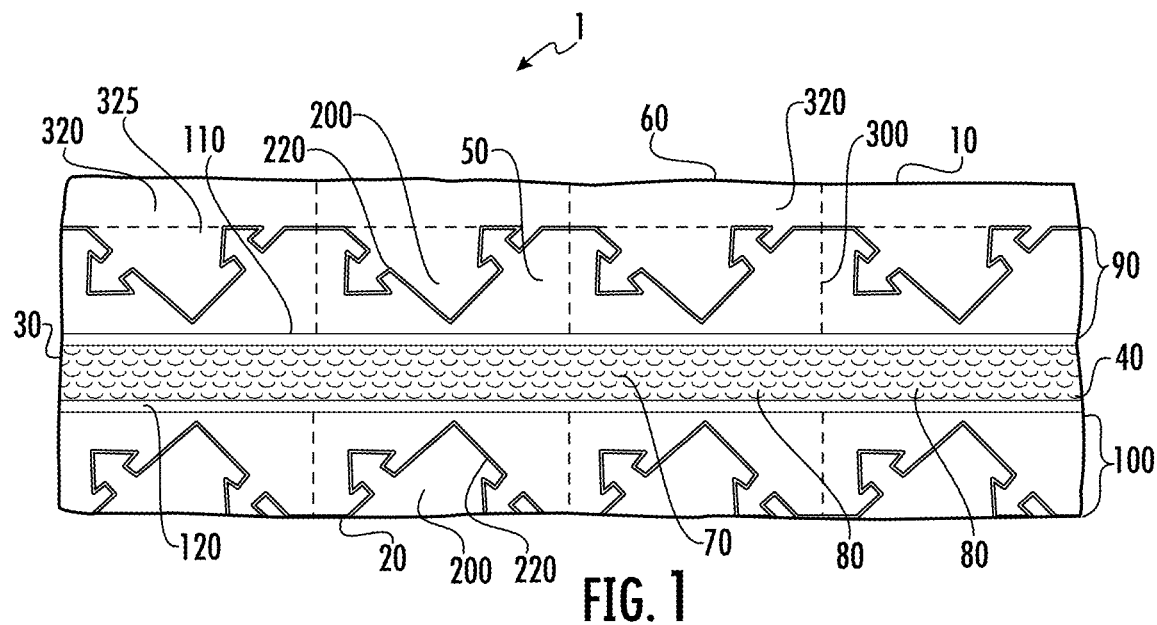
FIG. 1 illustrates an expandable foam plank including pre-notched-out portions in accordance with certain embodiments of the invention.

In one aspect and as illustrated in FIG. 1, the invention provides an expandable foam plank 1 comprising a top edge 10 and a bottom edge 20 opposing the top edge, in which a first distance between the top edge and the bottom edge defines a width of the expandable foam plank in a Y-direction in an unexpanded state. The expandable foam plank 1 also comprises a 30 first side edge and a second side edge 40 opposing the first side edge, in which a second distance between the first side edge and the second side edge defines a length of the expandable foam plank in a X-direction. The expandable foam plank 1 further comprises a first surface 50 and a second surface 60 opposing the first surface, in which a third distance between the first surface and the second surface defines a thickness of the expandable foam plank in a Z-direction in the unexpanded state. Additionally, the expandable foam plank 1 comprises an interior channel portion 70 extending from the first side edge 30 to the second side edge 40, in which the interior channel portion includes a plurality of arc-shaped cuts 80 extending through the thickness of the expandable foam plank, and wherein at least a portion (e.g., all or a majority thereof) of the arc-shaped cuts are aligned along the X-direction and are free to expand to form expanded openings 85 along the Y-direction in response to an external force applied to the expandable foam plank along the Y-direction. The expandable foam plank 1 may also include a first bracketing portion 90 extending from the first side edge 30 to the second side edge 40, and a second bracketing portion 100 extending from the first side edge 30 to the second side edge 40, in which the interior channel portion is located between the first bracketing portion and the second bracketing portion. In accordance with certain embodiments of the invention, the expandable foam plank is biased towards the unexpanded state (e.g., continuously biased toward to the unexpanded state).

Figure 9:
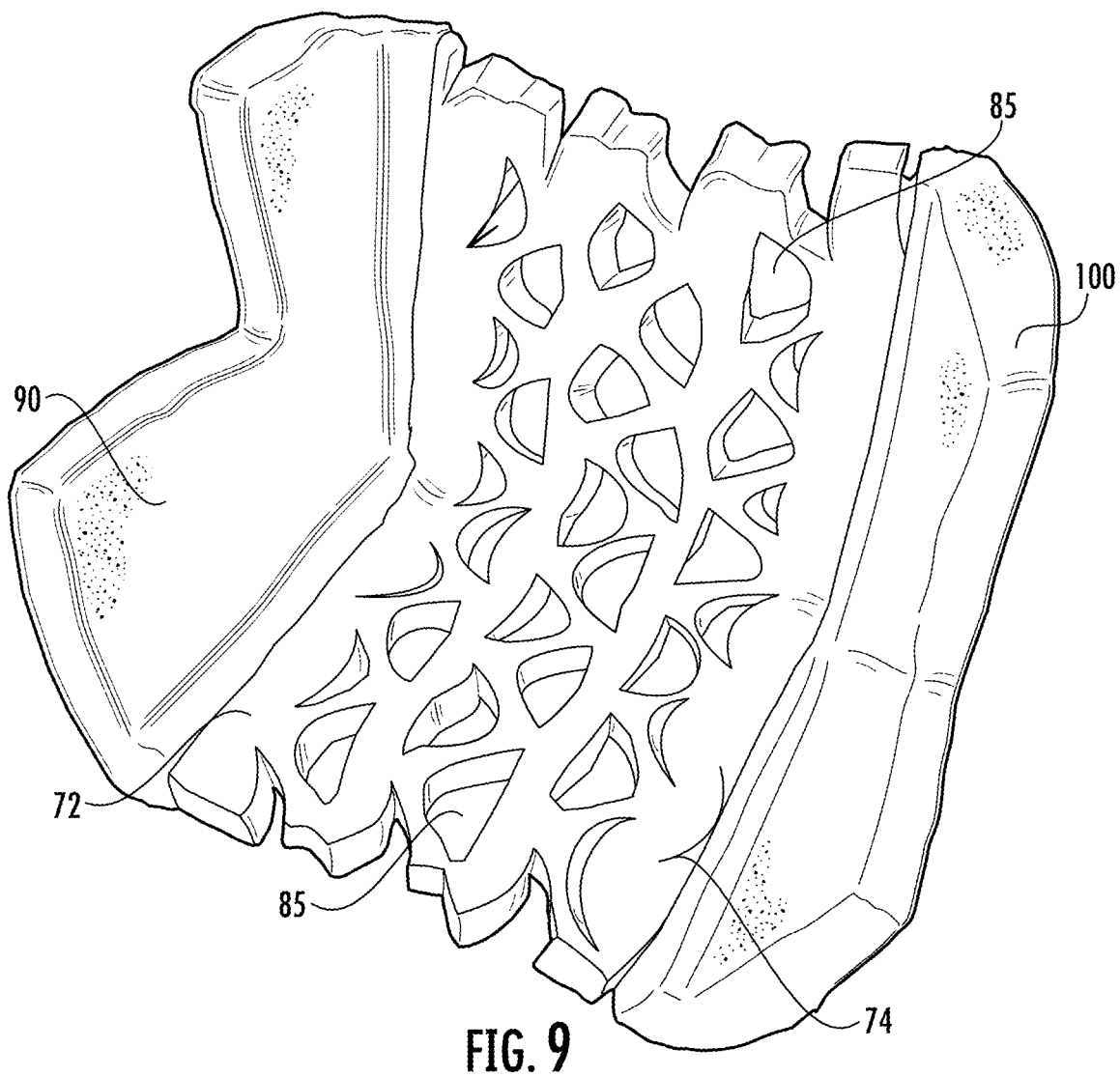
FIG. 9 illustrates the expandable foam corner protector of FIG. 8, in which all of the arc-shaped cuts are held within an expanded state to form expanded openings in accordance with certain embodiments of the invention.

In accordance with certain embodiments of the invention, the interior channel portion of the expandable foam plank may comprise from about 10% to about 80% of the width of the expandable foam plank in the unexpanded state, such as at least about any of the following: 10, 12, 15, 18, 20, 22, 25, 28, 30, 32, 35, 38, and 40% of the width of the expandable foam plank in the unexpanded state, and/or at most about any of the following: 80, 78, 75, 72, 70, 68, 65, 62, 60, 58, 55, 52, 50, 48, 45, 42, and 40% of the width of the expandable foam plank in the unexpanded state. Additionally or alternatively, the interior channel portion may comprise a first buffer region 72 (as shown in FIG. 9) located between the plurality of arc-shaped cuts 80 and the first bracketing portion 90, and a second buffer region 74 (as shown in FIG. 9) located between the plurality of arc-shaped cuts 80 and the second bracketing portion 100, wherein the first buffer region and the second buffer region are each devoid of the plurality of arc-shaped cuts and each extend between the first side edge and the second side edge. Additionally or alternatively, the first buffer region and the second buffer region may independently from each other comprise from about 0.5% to about 10% of the interior channel portion in the unexpanded state along the Y-direction, such as at least about any of the following: 0.1, 0.2, 0.4, 0.5, 1, 1.5, 2, 2.5, 3, 3.5, 4, 4.5, and 5% of the interior channel portion in the unexpanded state along the Y-direction, and/or at most about any of the following: 10, 9.5, 9, 8.5, 8, 7.5, 7, 6.5, 6, 5.5, and 5% of the interior channel portion in the unexpanded state along the Y-direction.

In accordance with certain embodiments of the invention, the expandable foam plank may comprise a first line of demarcation 110 between the first bracketing portion 90 and the interior channel portion 70. Additionally or alternatively, the expandable foam plank may comprise a second line of demarcation 120 between the second bracketing portion 100 and the interior channel portion 70. By way of example only, the first line of demarcation and/or the second line or demarcation independently from each other may comprise perforations, a plurality of divots, a continuous trough, or guide markings.

Figure 2:
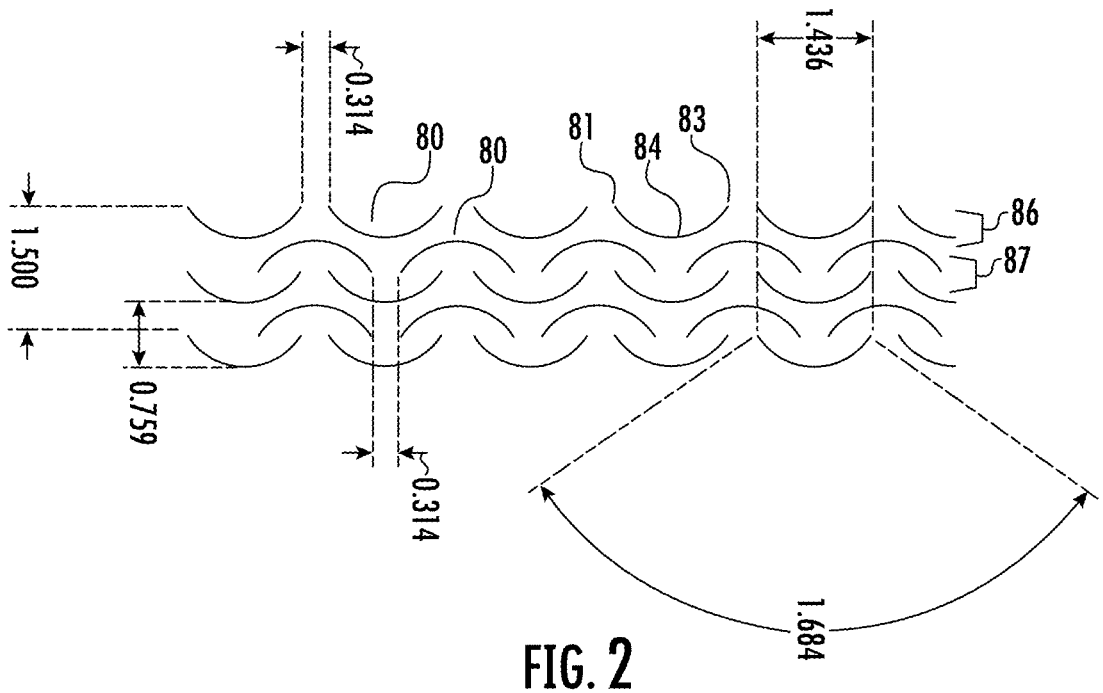
FIG. 2 illustrates an example pattern of arc-shaped cuts that may be imparted into an internal channel portion in accordance with certain embodiments of the invention.

In accordance with certain embodiments of the invention, the plurality of arc-shaped cuts may have an average arc length in the unexpanded state from about 1 to about 15 cm, such as at least about any of the following 1, 1.2, 1.5, 1.8, 2, 2.2, 2.5, 2.8, 3, 3.2, 3.5, 3.8, 4, 4.2, 4.5, 4.8, 5, 5.2, 5.5, 5.8, and 6 cm, and/or at most about any of the following: 15, 14.5, 14, 13.5, 13, 12.5, 12, 11.5, 11, 10.5, 10, 9.5, 9, 8.5, 8, 7.5, 6.5, and 6 cm. FIG. 2, for example, illustrates an example pattern of arc-shaped cuts 80 that may be imparted into an internal channel portion 70 in accordance with certain embodiments of the invention, in which relative dimensions are illustrated in inches. Additionally or alternatively, the plurality of arc-shaped cuts 80, as illustrated in FIG. 2, may have an average linear length from a first endpoint 81 to a second endpoint 83 along an imaginary straight line passing between the first endpoint and the second endpoint in the unexpanded state from about 0.5 to about 12 cm, such as from at least about any of the following: 0.5, 0.8, 1, 1.2, 1.5, 1.8, 2, 2.2, 2.5, 2.8, 3, 3.2, 3.5, 3.8, 4, 4.2, 4.5, 4.8, 5, 5.2, 5.5, 5.8, and 6 cm, and/or at most about any of the following: 12, 11.5, 11, 10.5, 10, 9.5, 9, 8.5, 8, 7.5, 6.5, and 6 cm. Additionally or alternatively, the plurality of arc-shaped cuts may have an average arc length-to-linear length ratio in the unexpanded state from about 1.1:1 to about 2:1, such as at least about any of the following: 1.1:1, 1.2:1, 1.3:1, 1.4:1, and 1.5:1, and/or at most about any of the following: 2:1, 1.9:1, 1.8:1, 1.7:1, 1.6:1, and 1.5:1. Additionally or alternatively, the plurality of arc-shaped cuts 80 may have an average depth measured from the imaginary straight line passing between the first endpoint 81 and the second endpoint 83 to an apex 84 of the arc-shaped cuts in the unexpanded state from about 1 to about 5 cm, such as at least about any of the following: 1, 1.2, 1.5, 1.8, 2, 2.2, 2.5 cm, and/or at most about any of the following: 5, 4.8, 4.5, 4.2, 4, 3.8, 3.5, 3.2, 3, 2.8, and 2.5 cm. Additionally or alternatively, the plurality of arc-shaped cuts 80 may have an average linear length-to-depth ratio in the unexpanded state from about 1.2:1 to about 5:1, such as at least about any of the following: 1.2:1, 1.5:1, 1.7:1, 1.9:1, 2:1, 2.2:1, 2.4:1 and 2.5:1, and/or at most about any of the following: 5:1, 4.5:1, 4:1, 3.5:1, 3:1, and 2.5:1.

In accordance with certain embodiments of the invention, the plurality of arc-shaped cuts 80 may comprise a plurality of rows (as illustrated in FIG. 2) of discrete arc-shaped cuts, in which the plurality of rows extend along the X-direction. For example, the plurality of rows may comprise from about 2 to about 40 rows, such as at least about any of the following: 2, 3, 4, 5, 6, 7, 8, 9, 10, 11, 12, 14, 15, 16, 18, and 20 rows, and/or at most about any of the following: 40, 38, 35, 32, 30, 28, 25, 22, and 20 rows. In accordance with certain embodiments of the invention, the plurality of rows (as illustrated in FIG. 2) may comprise (i) one or more rows of a first group 86 of arc-shaped cuts having a first concavity facing the first bracketing portion, and (ii) one or more rows of a second group 87 of arc-shaped cuts having a second concavity facing the second bracketing portion. In accordance with certain embodiments of the invention, the first group 86 of arc-shaped cuts and the second group 87 of arc-shaped cuts may be located or oriented in an alternating arrangement in the Y-direction, such as illustrated in FIG. 2.

In accordance with certain embodiments of the invention, the plurality of rows comprise a first average gap between adjacent discrete arc-shaped cuts 80 along the X-direction in the unexpanded state from about 0.5 to about 2 cm, such as at least about any of the following: 0.5, 0.65, 0.7, 0.75, 0.8, 0.85, 0.9, 0.95, and 1 cm, and/or at most about any of the following: 2, 1.9, 1.8, 1.7, 1.6, 1.5, 1.4, 1.3, 1.25, 1.2, 1.15, 1.1, 1.05, and 1 cm. Additionally or alternatively, the plurality of rows may comprise an average linear length-to-first average gap between adjacent discrete arc-shaped cuts along the X-direction in the unexpanded state from about 3:1 to about 7:1, such as at least about any of the following: 3:1, 3.2:1, 3.5:1, 3.8:1, 4:1, 4.2:1, and 4.5:1, and/or at most about any of the following: 7:1, 6.5:1, 6:1, 5.8:1, 5.5:1, 5.2:1, 5:1, 4.8:1, and 4.5:1. Additionally or alternatively, the plurality of rows comprise an average apex-to-apex gap between adjacent discrete arc-shaped cuts along the Y-direction in the unexpanded state from about 1 to about 3 cm, such as at least about any of the following: 1, 1.1, 1.2, 1.3, 1.4, 1.5, 1.6, 1.7, 1.8, 1.9, and 2 cm, and/or at most about any of the following: 3, 2.9, 2.8, 2.7, 2.6, 2.5, 2.4, 2.3, 2.2, 2.1, and 2 cm.

In accordance with certain embodiments of the invention, the interior channel portion 70 may have a cut density from about 0.15 to about 0.4 arc-shaped cuts per $cm^2$, such as at least about any of the following: 0.15, 0.16, 0.17, 0.18, 0.19, 0.2, 0.21, 0.22, 0.23, 0.24, 0.25, 0.26, 0.27, and 0.28 arc-shaped cuts per $cm^2$, and/or at most about any of the following: 0.4, 0.38, 0.36, 0.35, 0.34, 0.32, 0.3, 0.29, and 0.28 arc-shaped cuts per $cm^2$.

In accordance with certain embodiments of the invention, the first bracketing portion may be devoid of the plurality of arc-shaped cuts. Additionally or alternatively, the second bracketing portion may be devoid of the plurality of arc-shaped cuts.

Figure 3:
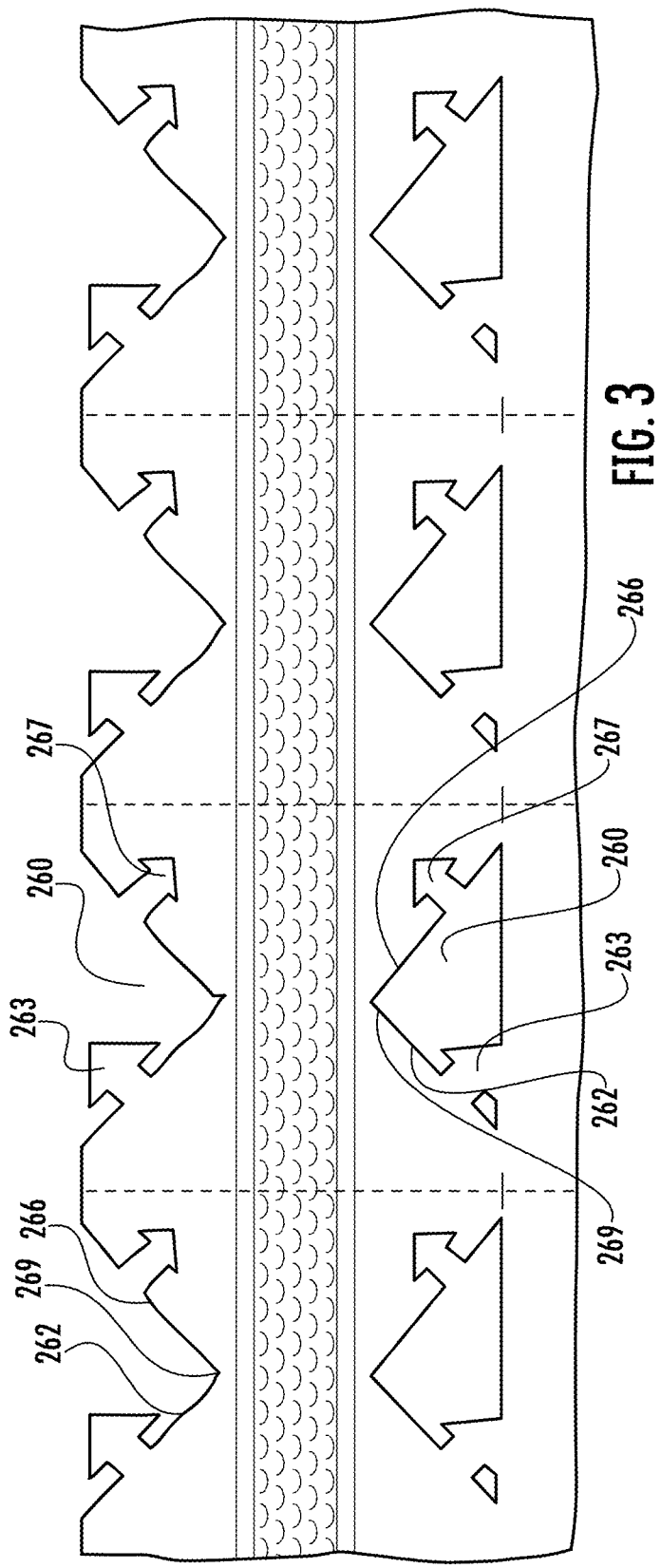
FIG. 3 illustrates the foam plank of FIG. 1 after removal of the pre-notched-out portions in accordance with certain embodiments of the invention.
Figure 4:
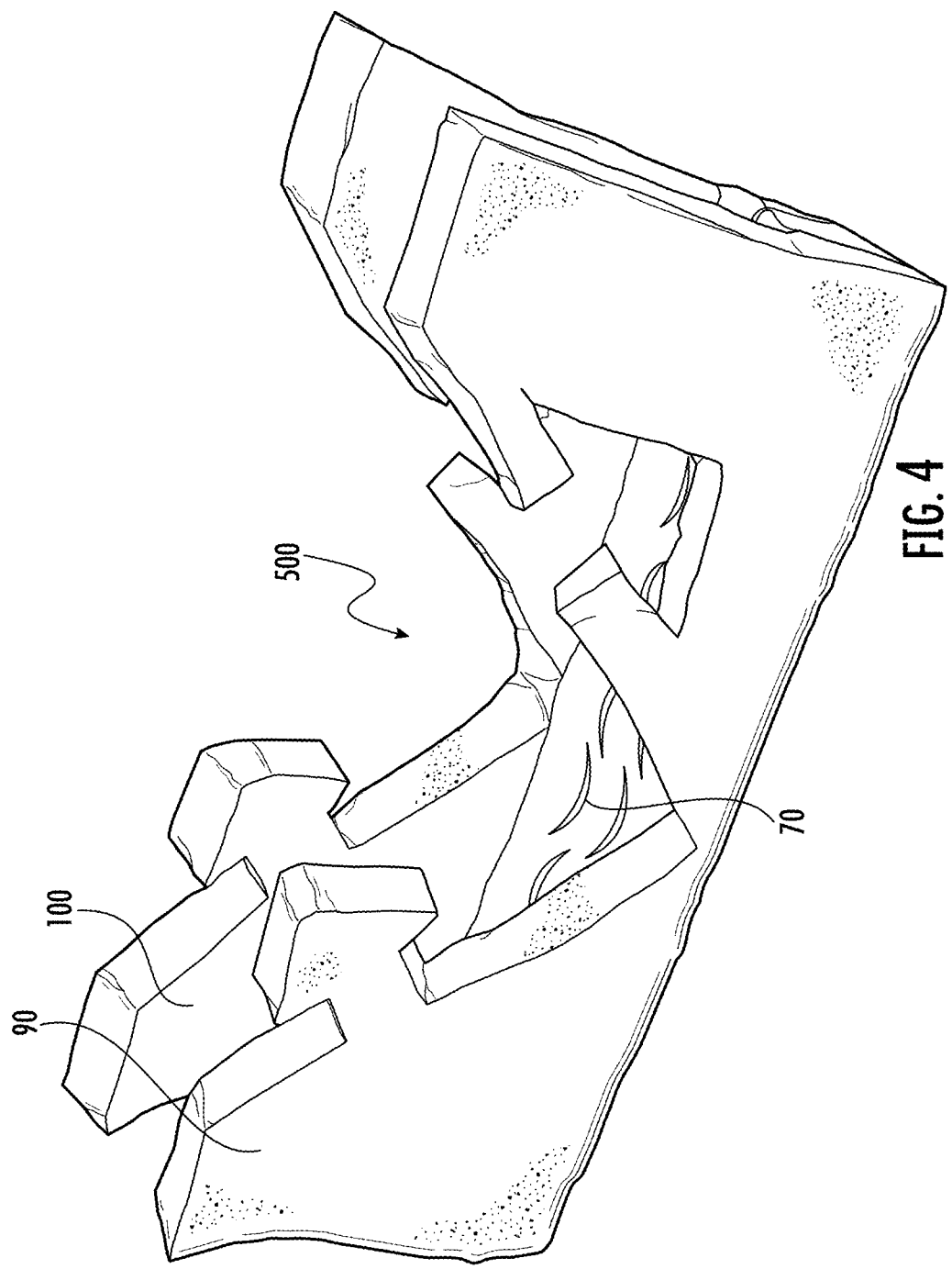
FIG. 4 illustrates an expandable foam corner protector in which the first and second bracketing portion are disengaged in accordance with certain embodiments of the invention.
Figure 5:
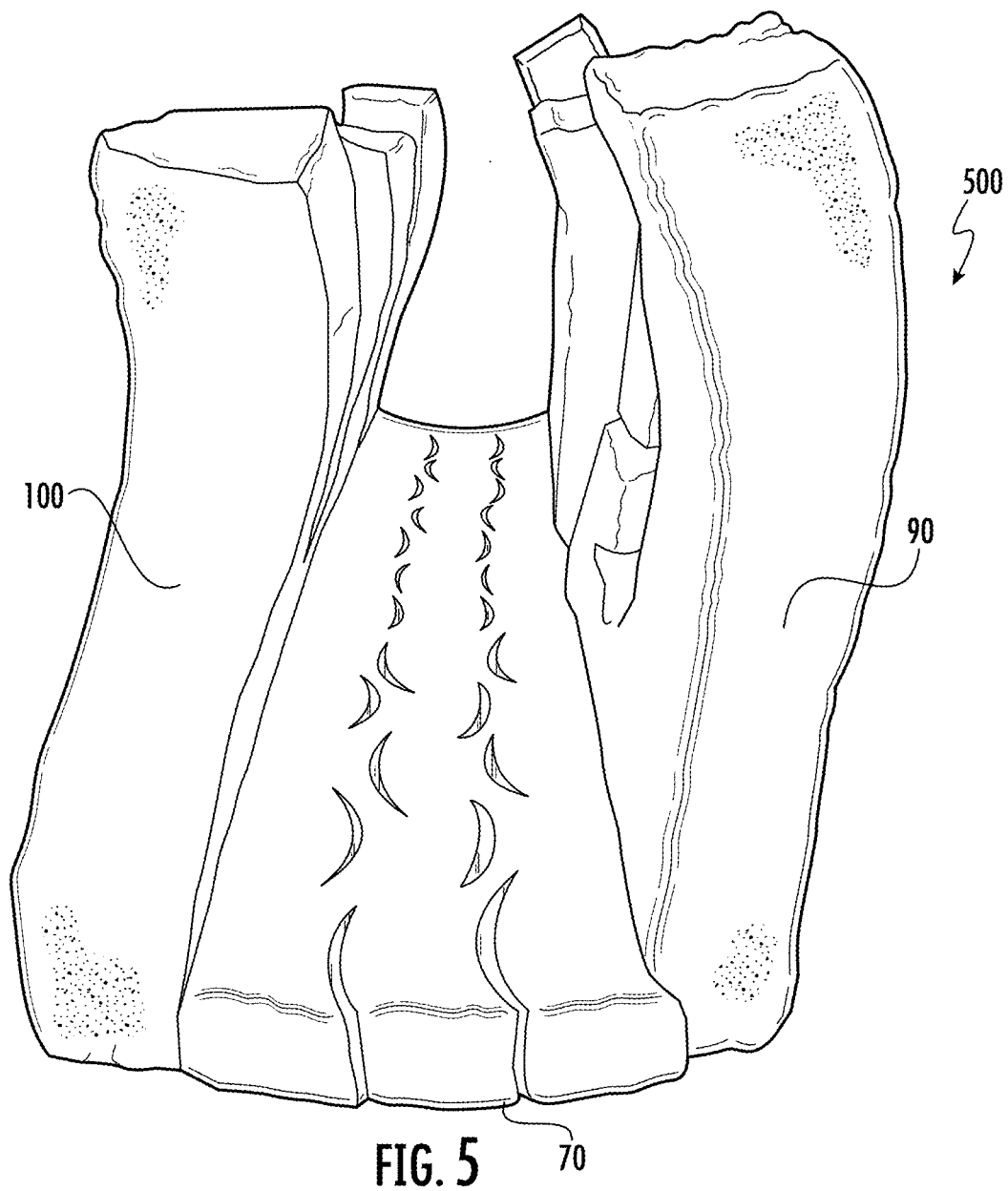
FIG. 5 illustrates a different view of the expandable foam corner protector of FIG. 4.

In accordance with certain embodiments of the invention and as illustrated in FIG. 1, the first bracketing portion 90 and the second bracketing portion 100 may each include one or more pre-notched-out sections 200 each defined by individual perforation networks 220, wherein the one or more pre-notched-out sections may include a first pre-notched-out section of the first bracketing portion and a second pre-notched-out section of the second bracketing portion. In this regard, the first pre-notched-out section and the second pre-notched-out section may be aligned along a first Y-axis. The pre-notched-out sections 200, for example, may be easily removed by a user at a point and/or time of use to define corresponding notched-out section(s) 260 as shown in FIG. 3. As illustrated in FIG. 3, for example, the notched-out section or sections 260 may include a first notched-out section formed within the first bracketing portion, in which the first notched-out portion includes a first recessed portion 262 extending from the top edge 10 towards the interior channel portion 70 and a second recessed portion 266 extending from the top edge 10 towards the interior channel portion 70. The first recessed portion 262 and the second recessed portion 266 may terminate at an intersection point 269 located inward from the top edge 10 and form a right angle therebetween. In accordance with certain embodiments of the invention, the first recessed portion 262 includes a male component 263 and the second recessed portion 266 includes a female component 267, wherein the female component comprises a recessed geometry formed into the second recessed portion and may be configured to accept and hold the male component of the first recessed portion.

In accordance with certain embodiments of the invention, the expandable foam plank may comprise one or more continuous lines of perforations 300 extending from the top edge 10 to the bottom edge 20, in which the one or more continuous lines of perforations may extend from the top edge to the bottom edge and define a plurality of corner protectors that are separable from each other via the one or more continuous lines of perforations extending from the top edge to the bottom edge.

In accordance with certain embodiments of the invention, the expandable foam plank may include a detachable component 320, such as shown in FIG. 1, defined by a network of perforations 325, wherein the detachable component extends from the first edge 30 to the second edge 40 or alternatively extends from the top edge to the bottom edge.

Figure 6:
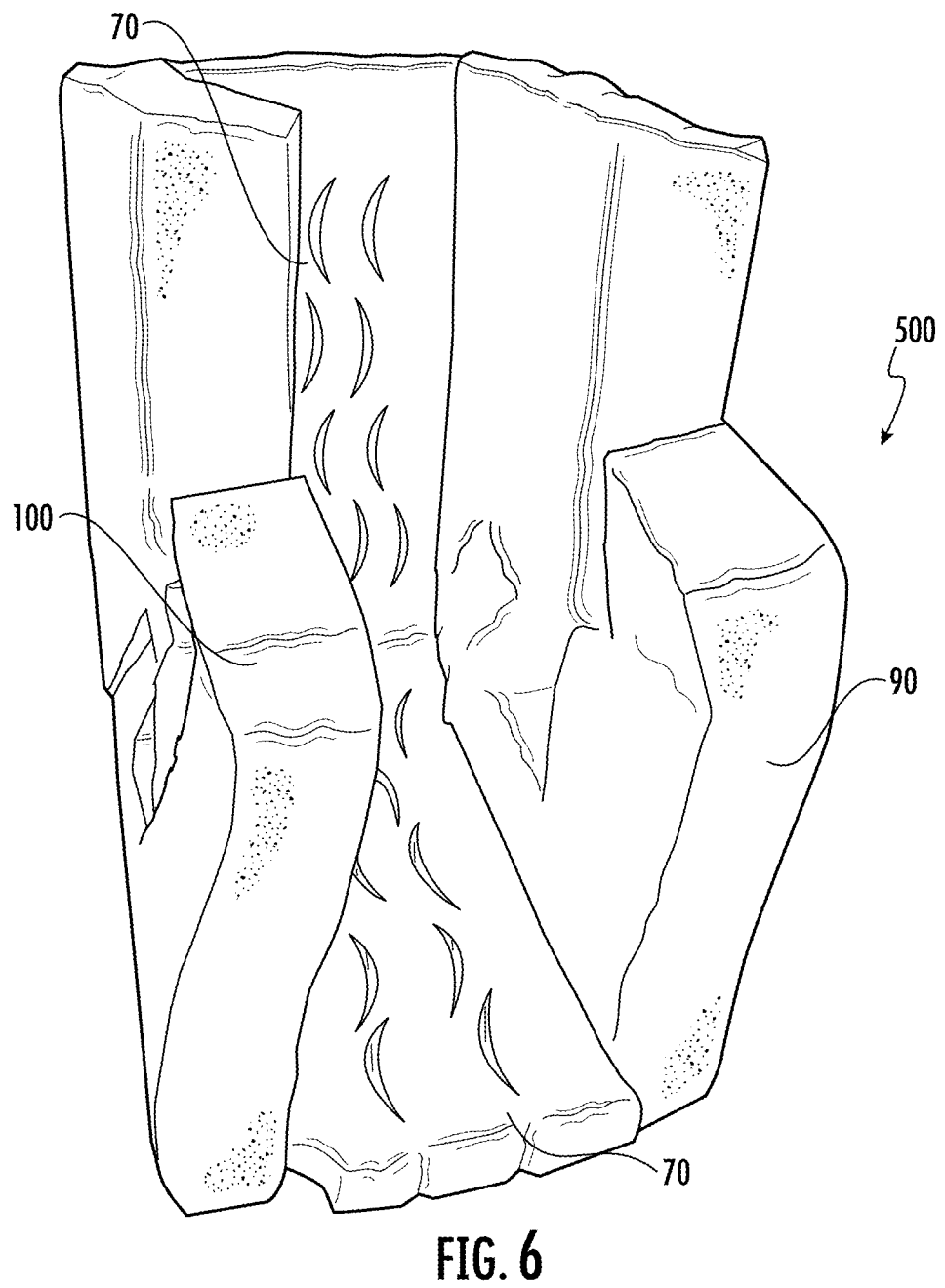
FIG. 6 illustrates the expandable foam corner protector in which the first and second bracketing portions are interlocked in accordance with certain embodiments of the invention.
Figure 7:
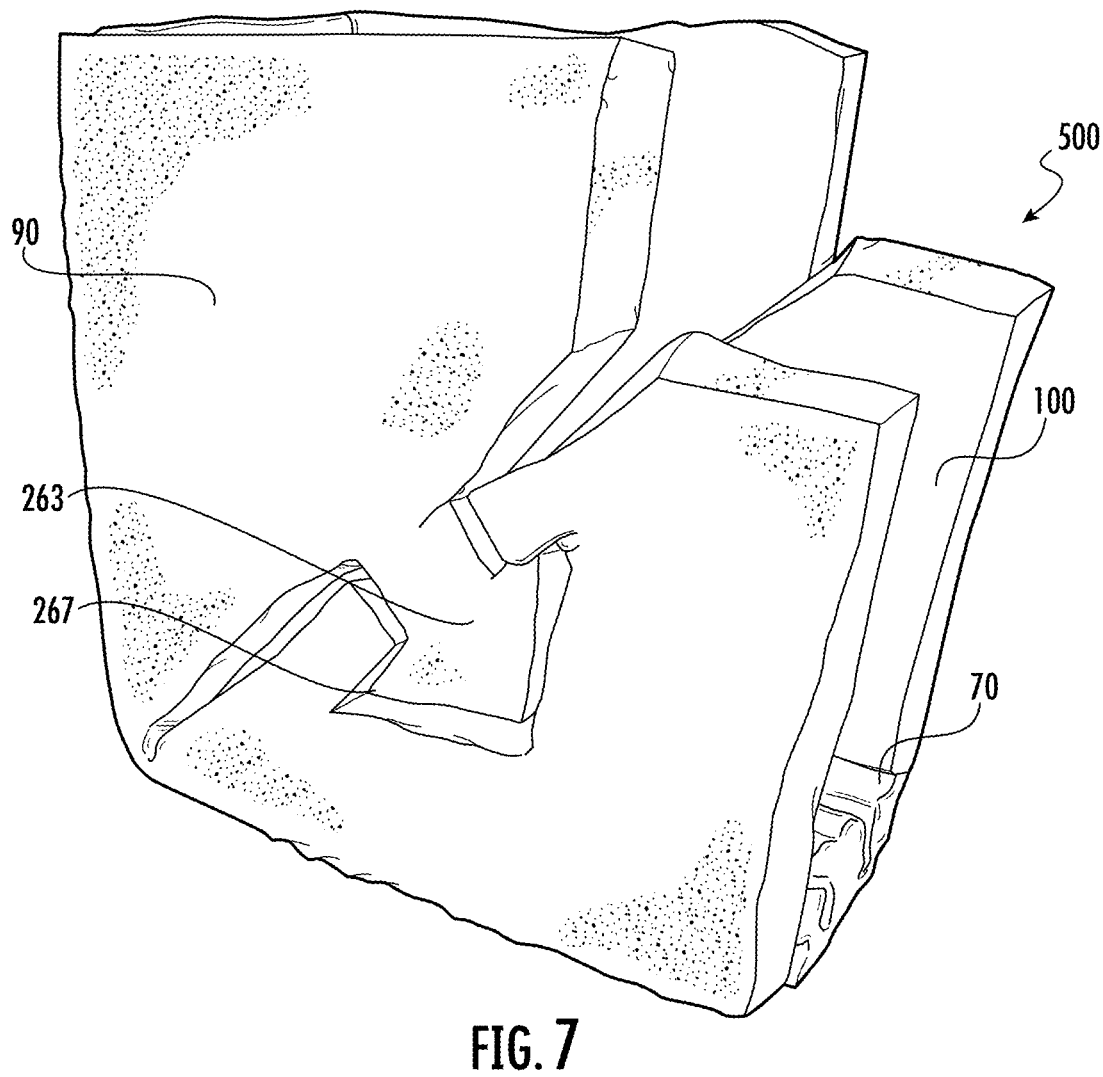
FIG. 7 illustrates a different view of the expandable foam corner protector of FIG. 6.
Figure 8:
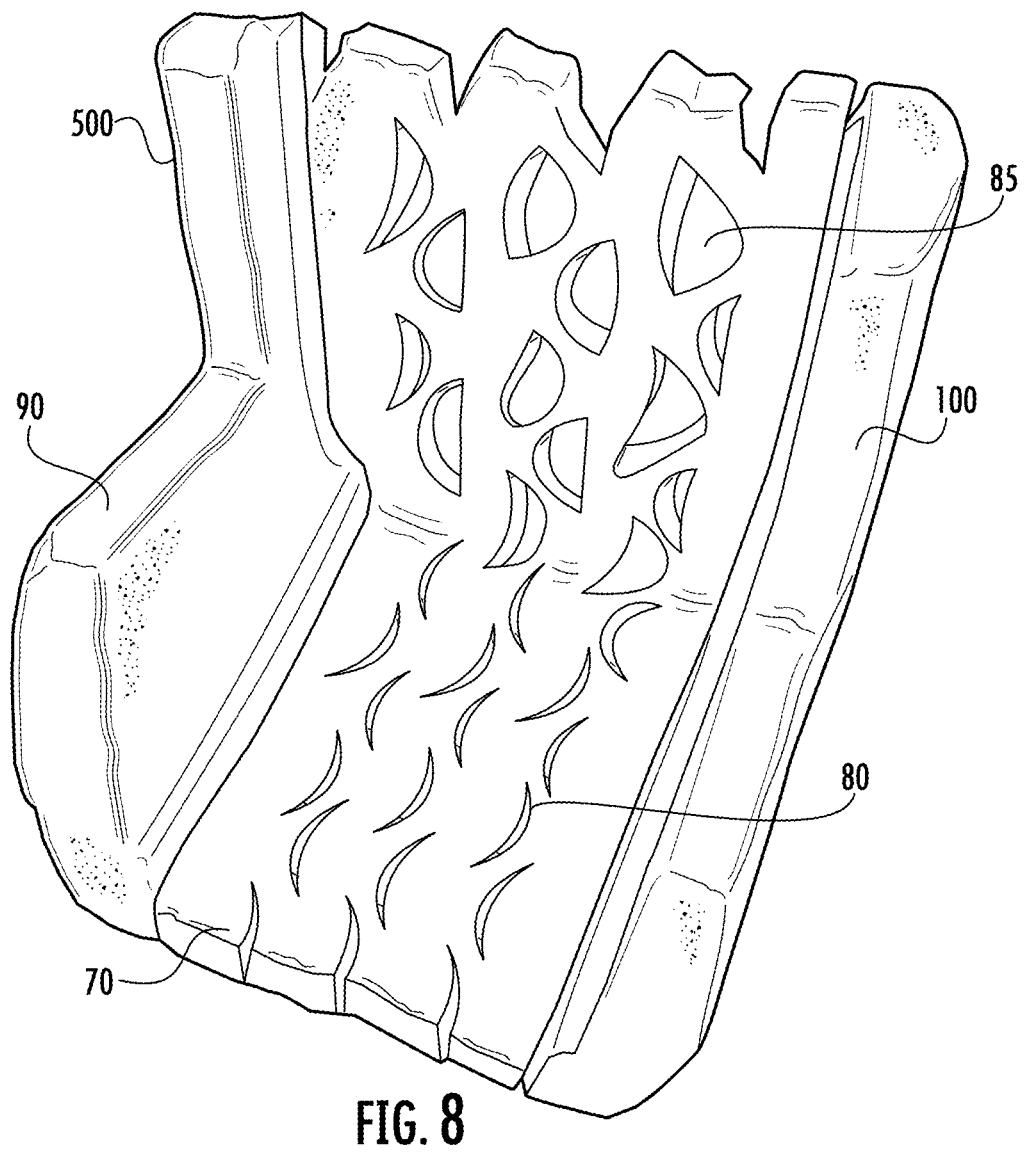
FIG. 8 illustrates an expandable foam corner protector in which a portion of the arc-shaped cuts are actively expanded to form expanded openings, while a portion of the arc-shaped cuts remain in a unexpandedstate in accordance with certain embodiments of the invention.

In another aspect, the present invention provides an expandable foam corner protector 500, such as those illustrated by FIGS. 4-14, comprising an expandable foam plank as described and disclosed herein. In accordance with certain embodiments of the invention, the first bracketing portion 90 and the second bracketing portion 100 may each be positioned generally perpendicular to the interior channel portion 70, and wherein the interior channel portion is free to expand in the Y-direction (e.g., via the plurality of arc-shaped cuts) from an unexpanded state in response to an external force applied to the interior channel portion in the Y-direction. In accordance with certain embodiments of the invention, the interior channel portion 70 may be configured (e.g., folded) to define a generally right angle configured to overlie a corner of an inanimate object, such as shown in FIGS. 6-9. The first bracketing portion 90 and the second bracketing portion 100, in accordance with certain embodiments of the invention, may each be configured (e.g., folded) into each other and interlocked, such as shown in FIG. 6, via respective male components and female components of notched-out portions to define opposing side walls configured to directly or indirectly overlie opposing side surfaces associated with a corner of the inanimate object. In accordance with certain embodiments of the invention, the expandable foam corner protector 500 may be biased (e.g., continually biased) towards the unexpanded state in the Y-direction and exert a compressive force in the Y-direction on the inanimate object housed therein.

In accordance with certain embodiments of the invention, the expandable foam corner protector, as noted above, comprises a plurality of expanded states, in which each of the plurality of expanded states are biased towards the unexpanded state. For example, the expandable foam corner protector may be continuously (e.g., always) biased towards the unexpanded state regardless of the degree of expansion realized and/or imparted onto the interior channel portion (e.g., degree to which arc-shaped cuts are expanded to form expanded openings). Additionally or alternatively, the expandable foam corner protector may be expanded into multiple incrementally different expanded states. For example, the degrees of expansion of the expandable foam corner protector are not governed or limited to stepwise increases in degrees of expansion. In this regard, the degree of expansion of the interior channel portion (and thus the expandable foam corner protector) may have a nearly infinite or limitless number of incrementally different degrees of expansion between the unexpanded state and a completely expanded state (e.g., a maximum expansion without tearing of the foam). In accordance with certain embodiments, for example, the completely expanded state may be at least two times (2×) larger than the unexpanded state in the Y-direction, such as at least about any of the following: 2, 2.5, 3, 3.5, 4, 4.5, and 5 times larger, and/or at most about any of the following: 10, 9.5, 9, 8.5, 8, 7.5, 7, 6.5, 6, 5.5, and 5 times larger. By way of example only, the interior channel portion may have a distance in the Y-direction of 2 inches and a distance in the Y-direction associated with a completely expanded (e.g., a maximum expansion without tearing of the foam) of 10 inches. In this example, the completely expanded state is five times (5×) larger than the unexpanded state in the Y-direction.

In accordance with certain embodiments of the invention, the interior channel portion comprises from about 2.5 to about 25 cm in the Y-direction in the unexpanded state, such as at least about any of the following: 2.5, 3, 4, 5, 6, 8, 10, and 12 cm in the Y-direction in the unexpanded state, and/or at most about any of the following: 25, 24, 22, 20, 18, 16, 15, 14, and 12 cm in the Y-direction in the unexpanded state.

In accordance with certain embodiments of the invention, the plurality of expanded states includes a first expanded state having a first compressive force in the Y-direction on the inanimate object housed within the expandable foam corner protector, and a second expanded state having a second compressive force in the Y-direction on the inanimate object housed within the expandable foam corner protector, in which the first expanded state has a greater degree of extension than the second expanded state and the first compressive force is greater than the second compressive force. Additionally or alternatively, the expandable foam corner protector may be devoid of any locked-in expanded states as noted previously.

Figure 10:
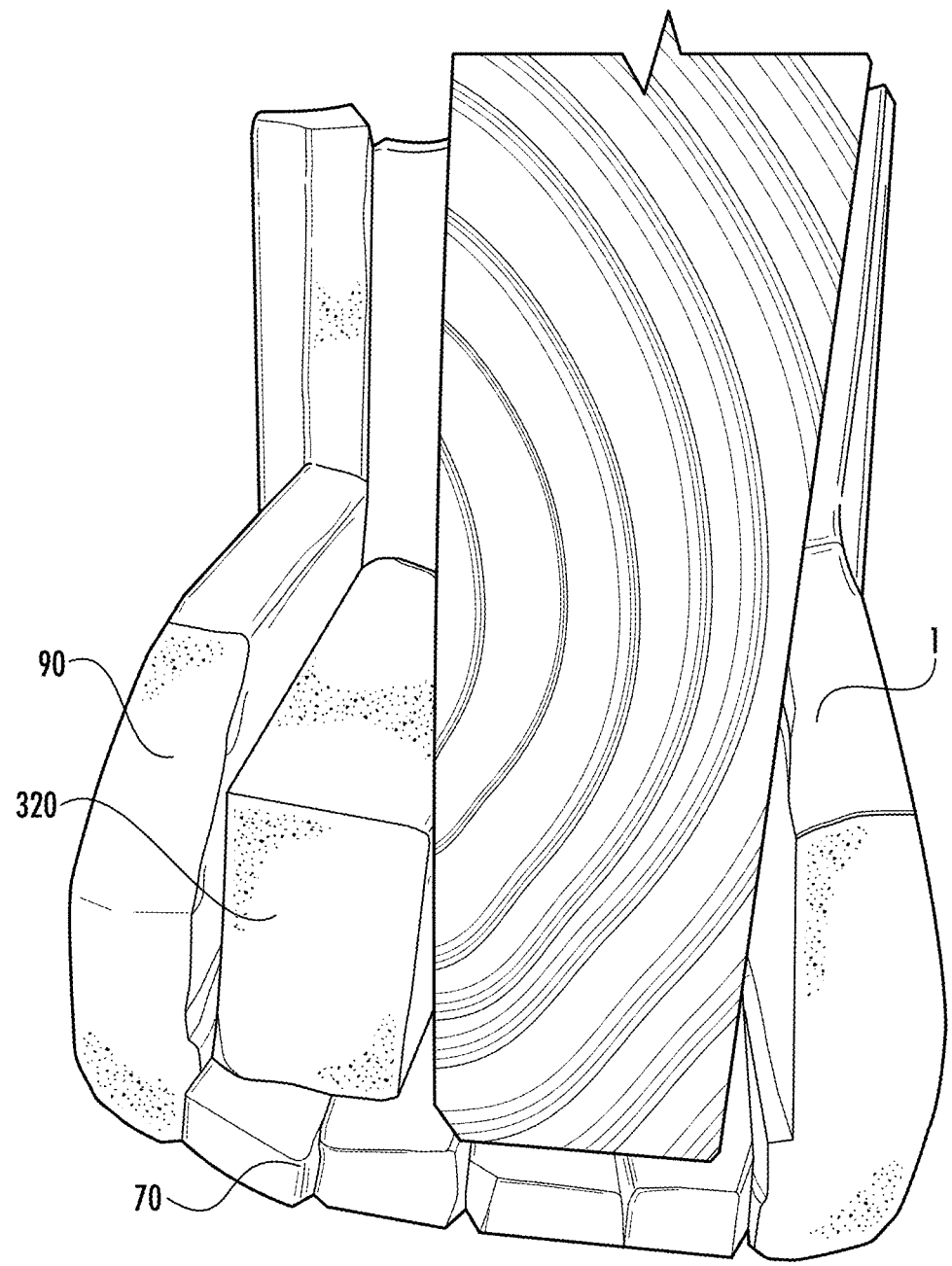
FIG. 10 illustrates an expandable foam corner protector housing an object and a detachable portion wedged between a first bracketing portion and the object in accordance with certain embodiments of the invention.
Figure 11:
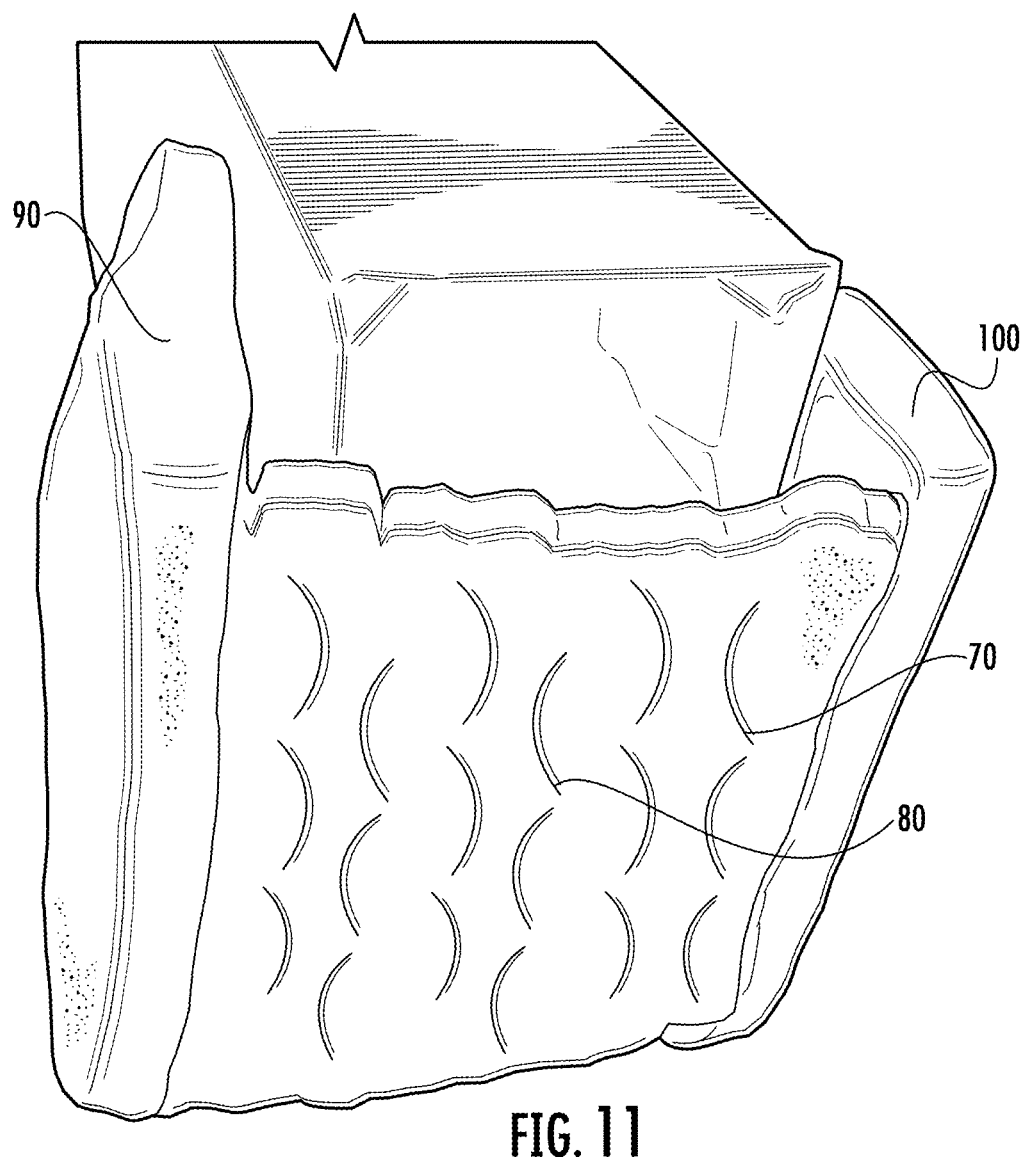
FIG. 11 illustrates an expandable foam corner protector housing an object in which the expandable foam corner is provided in the unexpanded state in accordance with certain embodiments of the invention.
Figure 12:
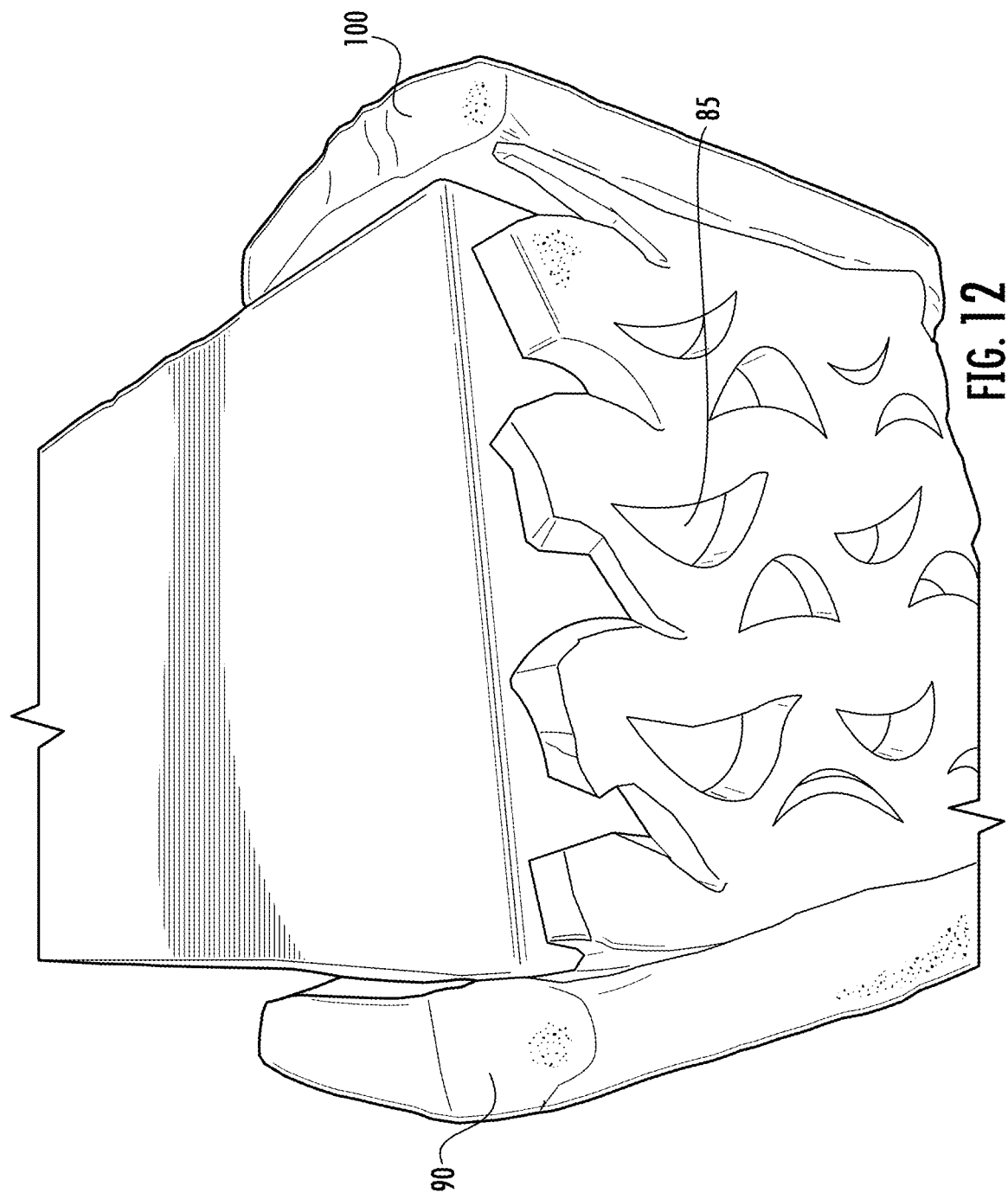
FIG. 12 illustrates the expandable foam corner protector of FIG. 11, in which the expandable foam corner protector is housing a thicker object that is causing the expandable foam corner protector to remain in an expanded state in accordance with certain embodiments of the invention.
Figure 13:
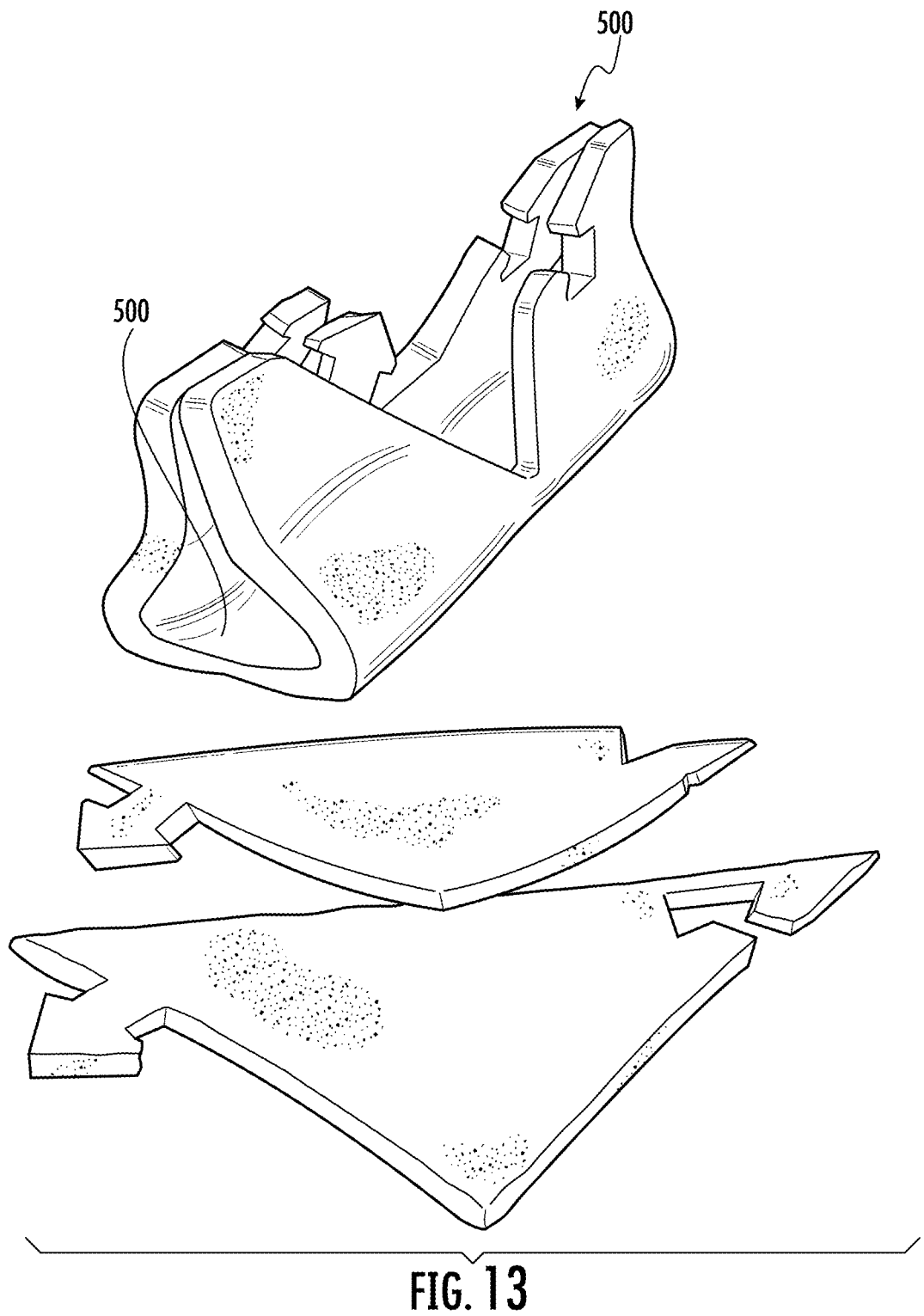
FIGS. 13 and 14 illustrate an expandable foam protector formed from a more flexible or pliant foam in accordance with certain embodiments of the invention.
Figure 14:
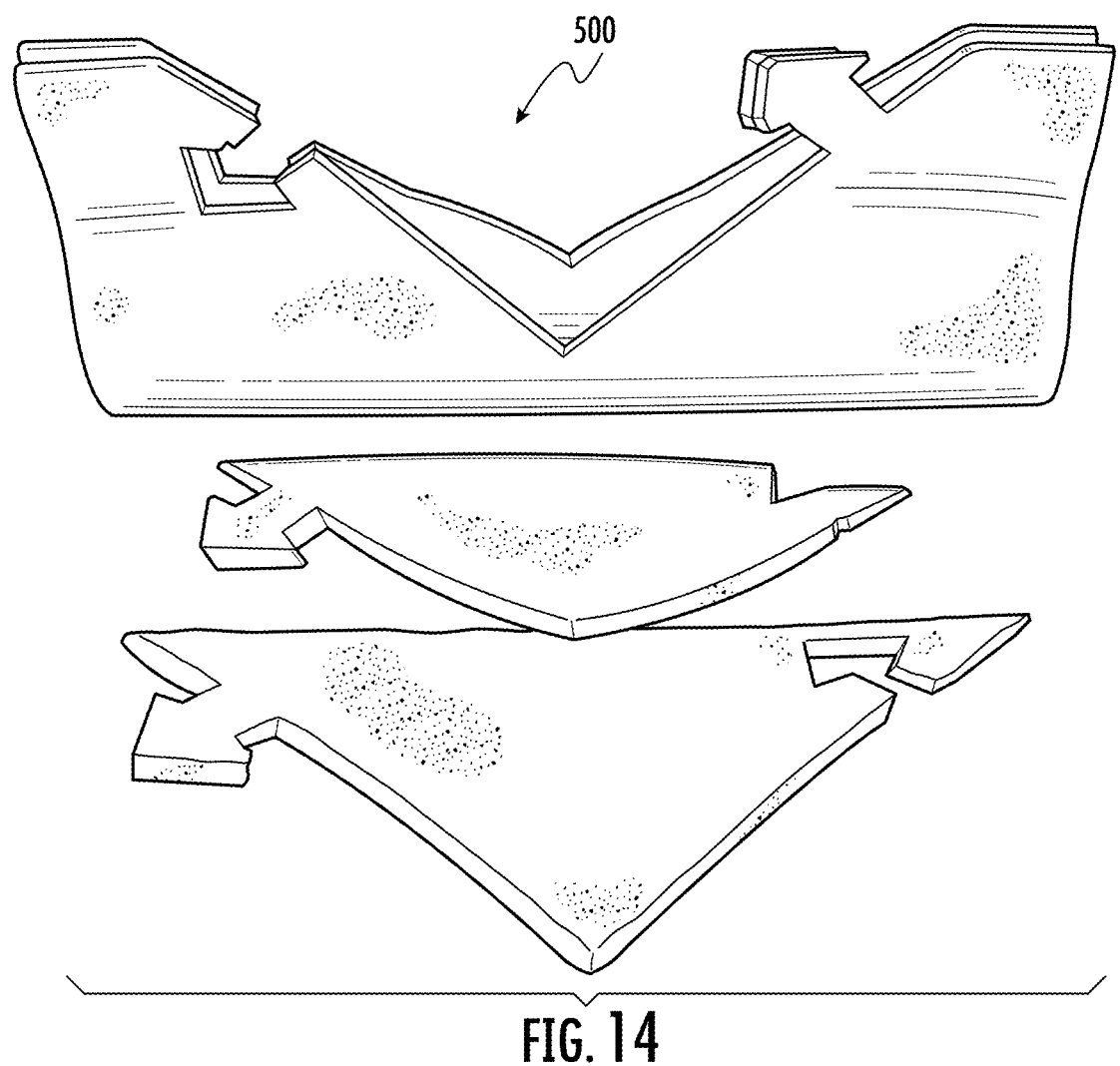

In accordance with certain embodiments of the invention, the expandable foam corner protector comprises a corner of an inanimate object housed therein, such as illustrated by FIGS. 10-12. In accordance with certain embodiments of the invention, the thickness of the corner of the inanimate object may be less than the distance of the interior channel portion in the unexpanded state as illustrated in FIG. 10. In this regard, FIG. 10 illustrates the use of the detachable portion 300 wedged in between a first bracketing portion 90 and the inanimate object to help secure the corner within the expandable foam corner protector. In this regard, the detachable portion 320 may be shimmed in between the first bracketing portion 90 and the inanimate object to fill-in any gap between the first bracketing portion 90 and the inanimate object. Stated somewhat differently, the expandable foam corner protector comprises a corner of an inanimate object housed therein, and wherein the thickness of the corner is smaller than a channel-distance in the Y-direction of the interior channel portion in an unexpanded state. In this regard, the expandable foam corner protector may comprises a shim or wedge positioned between the first bracket portion and the inanimate object. For example, the shim or wedge may comprises the detachable component or a pre-notched-out section that has been removed from the expandable foamed plank, such as shown in FIGS. 13 and 14 where the pre-notched-out portions have been removed and are available for use as a shim or wedge. FIG. 11 illustrates the corner of an inanimate object housed in an expandable foam corner protector, in which the thickness of the corner fits snuggly in the expandable foam corner protector in the unexpanded state. FIG. 12 illustrates, the corner of an inanimate object housed in an expandable foam corner protector, in which the thickness of the corner of the inanimate object is larger than a channel-distance in the Y-direction of the interior channel portion in an unexpanded state. In this regard, the interior channel portion is expanded to accommodate and corner of the inanimate object.

The expandable foam corner protector, in accordance with certain embodiments, may be manufactured with a pre-formed U-shaped channel and/or profile (e.g., from a single contiguous foam material). In this regard, the expandable foam corner protectors manufactured with a pre-formed U-shaped channel and/or profile may be extruded as a single piece that may include one or more sets of perforations (e.g., die cuts), such as perforations 300 illustrated in FIG. 1 but applied to a U-shaped channel and/or profile extruded article, that define a plurality of separate expandable foam corner protectors that may be separated from one another via the one or more perforations and/or one or more pre-notched-out sections. The expandable foam corner protector includes an interior channel portion comprising a plurality of arc-shaped cuts that enable expansion upon application of an external force and contraction of the interior channel portion to an unexpanded state when no external force is applied thereto. In accordance with certain embodiments of the invention, the expandable foam corner protector manufactured with a pre-formed U-shaped channel and/or profile may include a first bracketing portion and a second bracketing portion, in which the interior channel portion is located between the first bracketing portion and the second bracketing portion. In accordance with certain embodiments of the invention, the first bracketing portion and the second bracketing portion may each be positioned generally perpendicular to the interior channel portion, and wherein the interior channel portion is free to expand in a Y-direction (e.g., via the plurality of arc-shaped cuts) from an unexpanded state in response to an external force applied to the interior channel portion in the Y-direction. In this regard, the first bracketing portion and the second bracketing portion may define opposing side walls to complete the U-shaped channel profile. In accordance with certain embodiments of the invention, the interior channel portion may be configured (e.g., folded) to define a generally right angle configured to overlie a corner of an inanimate object. The first bracketing portion and the second bracketing portion, in accordance with certain embodiments of the invention, may each be configured (e.g., folded) into each other and interlocked via respective male components and female components of notched-out portions to define opposing side walls configured to directly or indirectly overlie opposing side surfaces associated with a corner of the inanimate object. In accordance with certain embodiments of the invention, the expandable foam corner protector may be biased (e.g., continually biased) towards the unexpanded state in the Y-direction and exert a compressive force in the Y-direction on the inanimate object housed therein.

Figure 15:
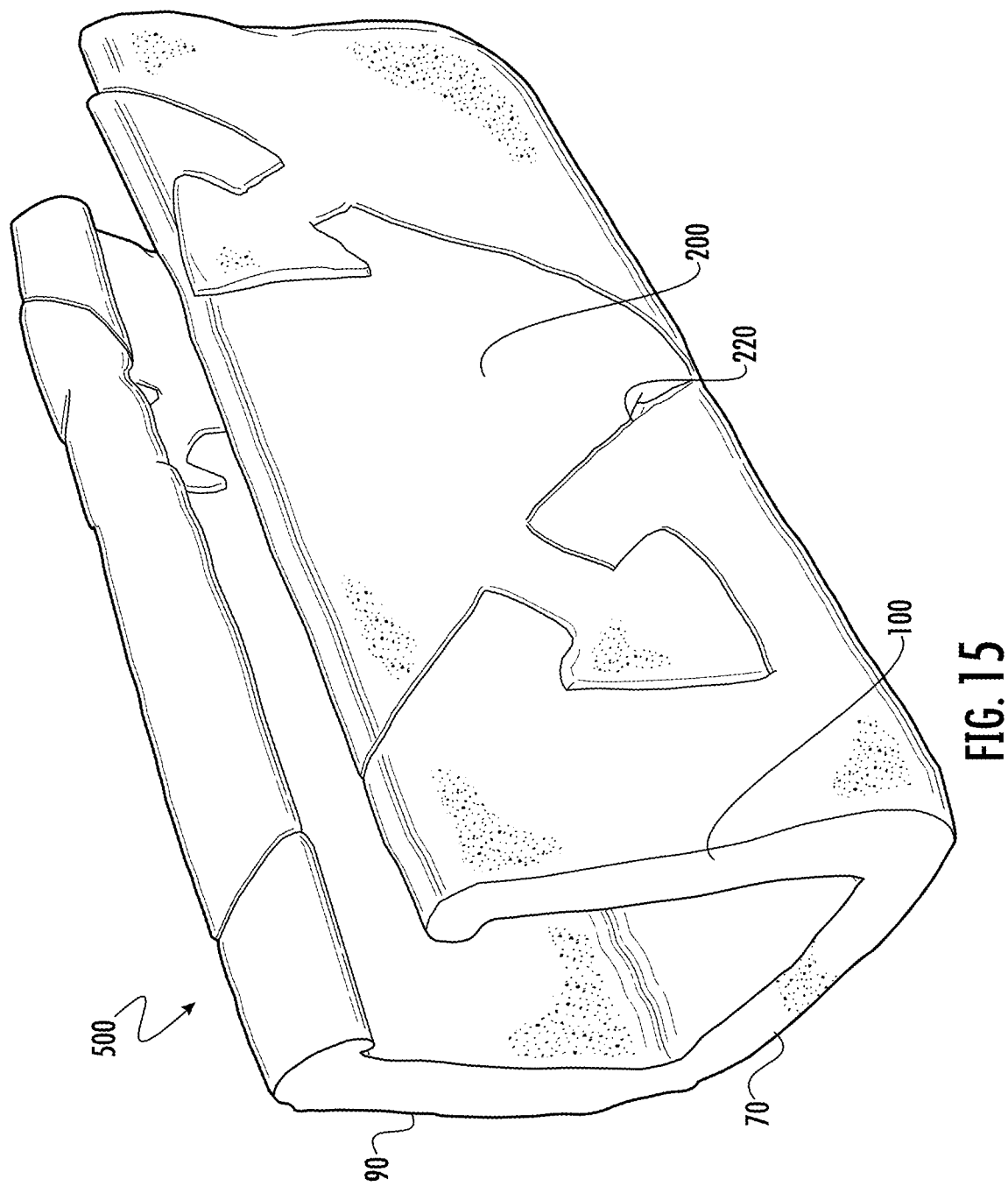
FIG. 15 illustrates an expandable foam corner protector manufactured with a pre-formed U-shaped channel and/or profile (e.g., from a single contiguous foam material) in accordance with certain embodiments of the invention.

FIG. 15, for instance, illustrates a expandable foam corner protectors 500 manufactured with a pre-formed U-shaped channel and/or profile extruded as a single piece from a single polymeric material (e.g., same foam composition). The expandable foam corner protector includes an interior channel portion 70 comprising a plurality of arc-shaped cuts 80 (e.g., shown in FIG. 16) that enable expansion upon application of an external force and contraction of the interior channel portion to an unexpanded state when no external force is applied thereto. The expandable foam corner protector 500 includes a first bracketing portion 90 and a second bracketing portion 100, in which the interior channel portion 70 is located between the first bracketing portion and the second bracketing portion. As illustrated in FIG. 15, the first bracketing portion 90 and the second bracketing portion 100 may be generally perpendicular to the interior channel portion 70 and define opposing side walls. In this regard, the first bracketing portion 90, the interior channel portion 70, and the second bracketing portion 100 may define a U-shaped channel and/or profile as best illustrated in FIG. 16. FIG. 15 illustrates an embodiment including optional pre-notched-out portion 200 defined by individual perforation networks 220 (e.g., a first pre-notched-out portion within the first bracketing portion and a corresponding or complementary second pre-notched-out portion within the second bracketing portion). The pre-notched out portion(s) may be easily removed via the perforation network(s) 220 to define corresponding notched-out section(s) 260 as shown in FIGS. 3 and 16. As illustrated in FIGS. 3 and 16, for example, the notched-out section or sections 260 may include a first notched-out section formed within the first bracketing portion, in which the first notched-out portion includes a first recessed portion 262 and a second recessed portion 266. The first recessed portion 262 and the second recessed portion 266 may terminate at an intersection point 269 and form a right angle therebetween. In accordance with certain embodiments of the invention, the first recessed portion 262 includes a male component 263 and the second recessed portion 266 includes a female component 267, wherein the female component comprises a recessed geometry formed into the second recessed portion and may be configured to accept and hold the male component of the first recessed portion.

In accordance with certain embodiments of the invention, the interior channel portion 70 may be configured (e.g., folded) to define a generally right angle configured to overlie a corner of an inanimate object, such as shown in FIG. 17. The first bracketing portion 90 and the second bracketing portion 100, in accordance with certain embodiments of the invention, may each be configured (e.g., folded) into each other and interlocked, such as shown in FIG. 17, via respective male components and female components of notched-out portions to define opposing side walls configured to directly or indirectly overlie opposing side surfaces associated with a corner of the inanimate object. In accordance with certain embodiments of the invention, the expandable foam corner protector 500 may be biased (e.g., continually biased) towards the unexpanded state in the Y-direction and exert a compressive force in the Y-direction on the inanimate object housed therein.

As noted above, the expandable foam corner protector (e.g., pre-formed U-shaped channel and/or profile extruded as a single piece) may be expanded into multiple incrementally different expanded states. For example, the degrees of expansion of the expandable foam corner protector are not governed or limited to stepwise increases in degrees of expansion. In this regard, the degree of expansion of the interior channel portion (and thus the expandable foam corner protector) may have a nearly infinite or limitless number of incrementally different degrees of expansion between the unexpanded state and a completely expanded state (e.g., a maximum expansion without tearing of the foam). In accordance with certain embodiments, for example, the completely expanded state may be at least two times (2×) larger than the unexpanded state in the Y-direction, such as at least about any of the following: 2, 2.5, 3, 3.5, 4, 4.5, and 5 times larger, and/or at most about any of the following: 10, 9.5, 9, 8.5, 8, 7.5, 7, 6.5, 6, 5.5, and 5 times larger. By way of example only, the interior channel portion may have a distance in the Y-direction of 2 inches and a distance in the Y-direction associated with a completely expanded (e.g., a maximum expansion without tearing of the foam) of 10 inches. In this example, the completely expanded state is five times (5×) larger than the unexpanded state in the Y-direction.

In accordance with certain embodiments of the invention, the interior channel portion comprises from about 2.5 to about 25 cm in the Y-direction in the unexpanded state, such as at least about any of the following: 2.5, 3, 4, 5, 6, 8, 10, and 12 cm in the Y-direction in the unexpanded state, and/or at most about any of the following: 25, 24, 22, 20, 18, 16, 15, 14, and 12 cm in the Y-direction in the unexpanded state.

In accordance with certain embodiments of the invention, the plurality of expanded states includes a first expanded state having a first compressive force in the Y-direction on the inanimate object housed within the expandable foam corner protector, and a second expanded state having a second compressive force in the Y-direction on the inanimate object housed within the expandable foam corner protector, in which the first expanded state has a greater degree of extension than the second expanded state and the first compressive force is greater than the second compressive force. Additionally or alternatively, the expandable foam corner protector may be devoid of any locked-in expanded states as noted previously.

In accordance with certain embodiments of the invention, the expandable foam corner protectors manufactured with a pre-formed U-shaped channel and/or profile extruded as a single piece may comprise any of the previously described dimensions or relative relationships between various elements of the above-described foam plank and/or expandable foam corner protectors formed from an expandable foam plank. By way of example, the plurality of arc-shaped cuts in the interior channel portion of the expandable foam corner protectors manufactured with a pre-formed U-shaped channel and/or profile extruded as a single piece may comprises any of the dimensions described above, such as in relation of FIG. 2.

In accordance with certain embodiments of the invention, the expandable foam corner protectors manufactured with a pre-formed U-shaped channel and/or profile extruded as a single piece may comprise a plurality of individual expandable foam corner protectors that may be separated from each other via a plurality of perforations or partial cuts such that they may be individually separated or torn-apart on an as-needed basis. By way of example only, the expandable foam corner protectors manufactured with a pre-formed U-shaped channel and/or profile extruded as a single piece may comprise four (4) individual expandable foam corner protectors defined by a plurality of perforations or partial cuts such that they may be individually separated or torn-apart on an as-needed basis. In this regard, for example, an expandable foam corner protector manufactured with a pre-formed U-shaped channel and/or profile extruded as a single piece that comprises four (4) individually separable expandable foam corner protectors may be particularly desirable for the packaging and/or protection of articles of manufacture having four corners (e.g., pictures, televisions, etc.).

In accordance with certain embodiments of the invention, the expandable foam corner protector may comprise a first L-shaped bracketing portion that may correspond to the first bracketing portion as disclosed and described herein in accordance with certain embodiments of the invention, a second L-shaped bracketing portion that may correspond to the second bracketing portion as disclosed and described herein in accordance with certain embodiments of the invention, and an interior channel as disclosed and described herein in accordance with certain embodiments of the invention. In this regard, the dimensions and relative dimensions of the previously described bracketing portions, interior channel portion, and arc-shape cuts may be applicable to such embodiments employing L-shaped bracketing portions, which may be pre-formed as part of a pre-formed U-shaped channel. In accordance with certain embodiments of the invention, for example, the interior channel portion may be located between the first L-shaped bracketing portion and the second L-shaped bracketing portion. Additionally or alternatively, the interior channel portion may include a plurality of arc-shaped cuts, such as disclosed and described herein, extending through a thickness in a Z-direction of the interior channel portion, and wherein at least a portion (e.g., all or a majority thereof) of the arc-shaped cuts are aligned along a X-direction and are free to expand to form expanded openings along a Y-direction in response to an external force applied to the expandable foam plank along the Y-direction. In accordance with certain embodiments of the invention, the first L-shaped bracketing portion and the second L-shaped bracketing portion may each be positioned generally perpendicular to the interior channel portion, and wherein the interior channel portion is free to expand in the Y-direction (e.g., via the plurality of arc-shaped cuts) from an unexpanded state in response to an external force applied to the interior channel portion in the Y-direction. In accordance with certain embodiments of the invention, the interior channel portion may be configured to define a generally right angle configured to overlie a corner of an inanimate object. The first L-shaped bracketing portion and the second L-shaped bracketing portion, in accordance with certain embodiments of the invention, may each be formed from a contiguous portion of foam (e.g., devoid of male and female interlocking features) or formed by folding corresponding male components and female components as disclosed and described herein. In accordance with certain embodiments of the invention, the expandable foam corner protector may be biased (e.g., continually biased) towards the unexpanded state in the Y-direction and exert a compressive force in the Y-direction on the inanimate object housed therein. Additionally or alternatively, the interior channel portion, the first L-shaped bracketing portion, and the second L-shaped bracketing portion may be formed from the same foam composition. Additionally or alternatively, the interior channel portion may be formed from a first foam composition and at least one (or both) of the L-shaped bracketing portions may be formed from a second foam composition. In accordance with certain embodiments of the invention, the expandable foam corner protector has a pre-formed U-shaped channel profile defined by the L-shaped bracket portions and the interior channel portion.

FIGS. 8-12, for example, illustrate an example embodiment in which the expandable foam corner protector includes a first L-shaped bracketing portion 90 that is devoid of any interlocking features (e.g., male and female connecting features) and a second L-shaped bracketing portion 100 that is devoid of any interlocking features (e.g., male and female connecting features) with an interior channel portion 70 disposed therebetween.

The first L-shaped bracketing portion and the second L-shaped bracketing portion of the expandable foam corner protector, in accordance with certain embodiments of the invention, may be positioned generally perpendicular to the interior channel portion. Additionally or alternatively, the first L-shaped bracketing portion and/or the second L-shaped bracketing portion may be formed from a respective contiguous portion of foam (e.g., L-shaped foam piece that is devoid of connecting features for forming and/or maintaining the L-shape). Alternatively, the first L-shaped bracketing portion and/or the second L-shaped bracketing portion may be formed by folding and interlocking corresponding male components and female components to define respective L-shaped bracketing portions.

In accordance with certain embodiments of the invention, the expandable foam corner protector may be continuously biased towards an unexpanded state in the Y-direction and exert a compressive force in the Y-direction on the inanimate object housed therein. Additionally or alternatively, the interior channel portion, the first L-shaped bracketing portion, and the second L-shaped bracketing portion are formed from the same foam composition. For example, the interior channel portion, first L-shaped bracketing portion, and the second L-shaped bracketing portion may comprise a contiguous and unitary article of manufacture. Alternatively, the interior channel portion may be formed from a first foam composition and at least one of the L-shaped bracketing portions may be formed from a second foam composition. For example, the interior channel portion, first L-shaped bracketing portion, and the second L-shaped bracketing portion may be formed separately and bonded together, such as by thermal bonding or adhesive bonding.

In accordance with certain embodiments of the invention, the pre-formed U-shaped channel profile may comprise one or more continuous lines of perforations configured to define a plurality of corner protectors that are separable from each other via the one or more continuous lines of perforations. For example, a pre-formed U-shaped channel profile may include a plurality of individual expandable foam corner protectors therein, in which each of the individual expandable foam corner protectors may be separated and detached from the pre-formed U-shaped channel profile via one or more continuous lines of perforations.

In yet another aspect, the present invention provides a method of forming an expandable foam plank. In accordance with certain embodiments of the invention, the method may comprise the following steps: (i) forming a foamable polymeric composition; (ii) extruding the foamable polymeric composition into the form of a plank having (a) a top edge and a bottom edge opposing the top edge that defines a width of the expandable foam plane in a Y-direction in an unexpanded state, (b) a first side edge and a second side edge opposing the first side edge that defines a length of the expandable foam plane in a X-direction in the unexpanded state, and (c) a first surface and a second surface opposing the first surface that defines a thickness of the expandable foam plank in a Z-direction in the unexpanded state; (iii) defining an interior channel portion extending from the first side edge to the second side edge and imparting a plurality of arc-shaped cuts extending through the thickness of the expandable foam plank in the interior channel portion, in which at least a portion (e.g., all or a majority thereof) of the arc-shaped cuts are aligned along the X-direction and being free to expand to form expanded openings along the Y-direction in response to an external force applied to the expandable foam plank along the Y-direction; (iv) defining a first bracketing portion extending from the first side edge to the second side edge, and defining a second bracketing portion extending from the first side edge to the second side edge, wherein the interior channel portion is located between the first bracketing portion and the second bracketing portion; and (v) forming a one or more pre-notched-out sections each defined by imparting corresponding individual perforation networks defining respective pre-notched-out sections in each of the first bracketing portion and the second bracketing portion, wherein the pre-notched out sections are removable to define corresponding notched-out portions. In accordance with certain embodiments of the invention, the expandable foam plank is biased towards the unexpanded state.

In accordance with certain embodiments of the invention, the foamable polymeric composition may comprise one or more of a polyolefin, a polyurethane, a rubber, a silicone resin, an ethylene/methyl acrylate copolymer, an ethylene/butyl acrylate copolymer, an ethylene/acrylic acid copolymer, an ethylene/methacrylic acid copolymer, an ionomer resin, a styrene/butadiene copolymer, a styrene/butadiene/styrene random and block copolymer, a styrene/isoprene/styrene random and block copolymer, or a styrene/ethylene/butylene copolymer. For example, the foamable polymeric composition may comprise one or more of an ethylene homopolymer, an ethylene/alpha-olefin copolymer, a propylene homopolymer, a propylene/alpha-olefin copolymer, or a polyurethane.

In accordance with certain embodiments of the invention, the foamable polymeric composition may comprise one or more additives. For example, the one more additives may comprise an ethylene-1-copolymer, which may be added to provide tear resistance to the final foam product. In accordance with certain embodiments of the invention, the foamable polymeric composition may comprise from about 0.1 to about 35% by weight of the ethylene-1-copolymer, such as at least about any of the following: 0.1, 0.3, 0.5, 0.8, 1, 1.2, 1.5, 1.8, 2, 2.2, 2.5, 5, 8, 10, 12, 15, 18, and 20% by weight, and/or at most about any one of the following: 35, 32, 30, 28, 26, 25, 24, 22, and 20% by weight. In accordance with certain embodiments of the invention, the foamable polymeric composition may include one or more chemical blowing agents and/or one or more physical blowing agents.

In accordance with certain embodiments of the invention, the method may comprise rotary cutting the expandable foam plank and some or all of the features associated therewith and described herein. For example, inline rotary of other cutting means may be employed.

In yet another aspect, the present invention provides a method of forming an expandable foam corner protector manufactured with a pre-formed U-shaped channel and/or profile (e.g., from a single contiguous foam material). In accordance with certain embodiments of the invention, the method may comprise the following steps: (i) forming a foamable polymeric composition; (ii) extruding the foamable polymeric composition into the form of a U-shaped channel and/or profile including (a) an interior channel portion, (b) a first bracketing portion generally perpendicular to the interior channel portion; and (c) a second bracketing portion interior channel portion; (iii) imparting a plurality of arc-shaped cuts into and/or through the interior channel portion, such as described and disclosed herein, that enable expansion upon application of an external force and contraction of the interior channel portion to an unexpanded state when no external force is applied thereto; (iv) optionally imparting a plurality of first perforations defining a plurality of individual expandable foam corner protectors separable from each other via the plurality of first perforations; and (v) optionally imparting a plurality of second perforations defining one or more pre-notched-out sections in the first bracketing portion and/or the second bracketing portion. In accordance with certain embodiments of the invention, the interior channel portion is located between the first bracketing portion and the second bracketing portion. In accordance with certain embodiments of the invention, the first bracketing portion and the second bracketing portion may each be positioned generally perpendicular to the interior channel portion, and wherein the interior channel portion is free to expand in a Y-direction (e.g., via the plurality of arc-shaped cuts) from an unexpanded state in response to an external force applied to the interior channel portion in the Y-direction. In this regard, the first bracketing portion and the second bracketing portion may define opposing side walls to complete the U-shaped channel and/or profile. In accordance with certain embodiments of the invention, the expandable foam plank is biased (e.g., continually biased) towards the unexpanded state in the Y-direction and exert a compressive force in the Y-direction on the inanimate object housed therein.

In accordance with certain embodiments of the invention, the foamable polymeric composition may comprise one or more of a polyolefin, a polyurethane, a rubber, a silicone resin, an ethylene/methyl acrylate copolymer, an ethylene/butyl acrylate copolymer, an ethylene/acrylic acid copolymer, an ethylene/methacrylic acid copolymer, an ionomer resin, a styrene/butadiene copolymer, a styrene/butadiene/styrene random and block copolymer, a styrene/isoprene/styrene random and block copolymer, or a styrene/ethylene/butylene copolymer. For example, the foamable polymeric composition may comprise one or more of an ethylene homopolymer, an ethylene/alpha-olefin copolymer, a propylene homopolymer, a propylene/alpha-olefin copolymer, or a polyurethane.

In accordance with certain embodiments of the invention, the foamable polymeric composition may comprise one or more additives. For example, the one more additives may comprise an ethylene-1-copolymer, which may be added to provide tear resistance to the final foam product. In accordance with certain embodiments of the invention, the foamable polymeric composition may comprise from about 0.1 to about 35% by weight of the ethylene-1-copolymer, such as at least about any of the following: 0.1, 0.3, 0.5, 0.8, 1, 1.2, 1.5, 1.8, 2, 2.2, 2.5, 5, 8, 10, 12, 15, 18, and 20% by weight, and/or at most about any one of the following: 35, 32, 30, 28, 26, 25, 24, 22, and 20% by weight. In accordance with certain embodiments of the invention, the foamable polymeric composition may include one or more chemical blowing agents and/or one or more physical blowing agents.

In accordance with certain embodiments of the invention, the method may comprise rotary cutting the expandable foam plank and some or all of the features associated therewith and described herein. For example, inline rotary of other cutting means may be employed.

In another aspect, the present invention provides a preformed U-shaped channel configured as an expandable foam corner protector. The method may comprise the following: (i) forming at least one foamable polymeric composition; (ii) extruding the at least one foamable polymeric composition into the form of a first L-shaped bracketing portion or a first bracketing portion; (iii) extruding the at least one foamable polymeric composition into the form of a second L-shaped bracketing portion or a second bracketing portion; (iv) extruding the at least one foamable polymeric composition into the form of an interior channel portion; (v) imparting a plurality of arc-shaped cuts extending through a thickness of the interior channel portion, and wherein at least a portion of the arc-shaped cuts are aligned along a X-direction and being free to expand to form expanded openings along a Y-direction in response to an external force applied to the expandable foam plank along the Y-direction; and (vi) (a) the first L-shaped bracketing portion or the first bracketing portion, the second L-shaped bracketing portion or the second bracketing portion, and the interior channel portion are extruded as a contiguous and unitary article of manufacture or (b) the first L-shaped bracketing portion or the first bracketing portion, the second L-shaped bracketing portion or the second bracketing portion, and the interior channel portion are extruded separately and bonded together to define the expandable foam corner protector. In accordance with certain embodiments of the invention, the interior channel portion may be positioned between the first L-shaped bracketing portion and the second L-shaped bracketing portion, in which the interior channel portion may be configured to define a generally right angle configured to overlie a corner of an inanimate object, and wherein the first L-shaped bracketing portion, the second L-shaped bracketing portion, and the interior portion define a U-shaped channel including the generally right angle of the interior channel portion. Alternatively, the interior channel portion may be positioned between the first bracketing portion and the second bracketing portion, in which each of the first bracketing portion and the second bracketing portion are folded into themselves and interlocked into respective L-shaped configurations via respective male and female connector portions, and wherein the interior channel portion may be configured to define a generally right angle configured to overlie a corner of an inanimate object, and wherein the respective L-shaped configurations and the interior portion define a U-shaped channel including the generally right angle of the interior channel portion.

In yet another aspect, the present invention provides a method of protecting a corner of an inanimate object. The method may include the following steps: (i) providing an expandable foam plank as described and disclosed herein; (ii) folding the first bracketing portion and the second bracketing portion to a position generally perpendicular to the interior channel portion; (iii) interlocking the first bracketing portion to itself via a first notched out section to define a first side wall, and interlocking the second bracketing portion to itself via a second notched out section to define a second side wall; (iv) folding the interior channel portion to define a generally right angle configured to overlie a corner of the inanimate object, in which steps (i)-(iv) form an expandable foam corner protector as described and disclosed herein; (v) expanding the interior channel portion to an expanded state; (vi) inserting the corner of the inanimate object into the expandable foam corner protector; and (vii) allowing the first side wall and the second side wall to clamp onto opposing side surfaces of the inanimate object.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. An expandable foam corner protector, comprising:
   (i) a first L-shaped bracketing portion;
   (ii) a second L-shaped bracketing portion; and
   (iii) an interior channel portion including a plurality of arc-shaped cuts extending through a thickness in a Z-direction of the interior channel portion, and wherein at least a portion of the arc-shaped cuts are aligned along a X-direction and are free to expand to form expanded openings along a Y-direction in response to an external force applied to the interior channel portion along the Y-direction;
   wherein the interior channel portion is positioned between the first L-shaped bracketing portion and the second L-shaped bracketing portion, wherein the interior channel portion is configured to define a generally right angle configured to overlie a corner of an inanimate object, and wherein the first L-shaped bracketing portion, the second L-shaped bracketing portion, and the interior portion define a U-shaped channel including the generally right angle of the interior channel portion.

2. The expandable foam corner protector of claim 1, wherein the first L-shaped bracketing portion and the second L-shaped bracketing portion are each positioned generally perpendicular to the interior channel portion.

3. The expandable foam corner protector of claim 1, wherein the first L-shaped bracketing portion and/or the second L-shaped bracketing portion are formed from a respective contiguous portion of foam.

4. The expandable foam corner protector of claim 1, wherein the first L-shaped bracketing portion and/or the second L-shaped bracketing portion are formed by folding an interlocking corresponding male components and female components to define respective L-shaped bracketing portions.

5. The expandable foam corner protector of claim 1, wherein the expandable foam corner protector is continuously biased towards an unexpanded state in the Y-direction and exerts a compressive force in the Y-direction on the inanimate object housed therein.

6. The expandable foam corner protector of claim 1, wherein the interior channel portion, the first L-shaped bracketing portion, and the second L-shaped bracketing portion are formed from the same foam composition.

7. The expandable foam corner protector of claim 1, wherein the interior channel portion, first L-shaped bracketing portion, and the second L-shaped bracketing portion comprise a contiguous and unitary article of manufacture.

8. The expandable foam corner protector of claim 1, wherein (i) the plurality of arc-shaped cuts has an average arc length in the unexpanded state from about 1 to about 15 cm, (ii) the plurality of arc-shaped cuts has an average linear length from a first endpoint to a second endpoint along an imaginary straight line passing between the first endpoint and the second endpoint in the unexpanded state from about 0.5 to about 12 cm; (iii) the plurality of arc-shaped cuts has an average arc length-to-linear length ratio in the unexpanded state from about 1.1:1 to about 2:1, or any combination of (i)-(iii).

9. The expandable foam corner protector of claim 8, wherein the plurality of arc-shaped cuts has an average depth measured from the imaginary straight line passing between the first endpoint and the second endpoint to an apex of the arc-shaped cuts in the unexpanded state from about 1 to about 5 cm.

10. The expandable foam corner protector of claim 9, wherein the plurality of arc-shaped cuts has an average linear length-to-depth ratio in the unexpanded state from about 1.2:1 to about 5:1.

11. The expandable foam corner protector of claim 1, wherein plurality of arc-shaped cuts comprise a plurality of rows of discrete arc-shaped cuts, the plurality of rows extending along the X-direction.

12. The expandable foam corner protector of claim 11, wherein the plurality of rows comprises from about 2 to about 40 rows.

13. The expandable foam corner protector of claim 11, wherein the plurality of rows comprise (i) one or more rows of a first group of arc-shaped cuts having a first concavity facing the first bracketing portion, and (ii) one or more rows of a second group of arc-shaped cuts having a second concavity facing the second bracketing portion.

14. The expandable foam corner protector of claim 13, wherein the first group of arc-shaped cuts and the second group of arc-shaped cuts are located in an alternating arrangement in the Y-direction.

15. The expandable foam corner protector claim 14, wherein (i) the plurality of rows comprise a first average gap between adjacent discrete arc-shaped cuts along the X-direction in the unexpanded state from about 0.5 to about 2 cm; (ii) the plurality of rows comprise an average linear length-to-first average gap between adjacent discrete arc-shaped cuts along the X-direction in the unexpanded state from about 3:1 to about 7:1; (iii) the plurality of rows comprise an average apex-to-apex gap between adjacent discrete arc-shaped cuts along the Y-direction in the unexpanded state from about 1 to about 3 cm; or any combination of (i)-(iii).

16. The expandable foam corner protector claim 1, wherein interior channel portion has a cut density from about 0.15 to about 0.4 arc-shaped cuts per $cm^2$.

17. A method of forming an expandable foam corner protector, comprising:
(i) forming at least one foamable polymeric composition;
(ii) extruding the at least one foamable polymeric composition into the form of a first L-shaped bracketing portion or a first bracketing portion;
(iii) extruding the at least one foamable polymeric composition into the form of a second L-shaped bracketing portion or a second bracketing portion;
(iv) extruding the at least one foamable polymeric composition into the form of an interior channel portion;
(v) imparting a plurality of arc-shaped cuts extending through a thickness of the interior channel portion, and wherein at least a portion of the arc-shaped cuts are aligned along a X-direction and being free to expand to form expanded openings along a Y-direction in response to an external force applied to the expandable foam plank along the Y-direction; and
(vi) (a) the first L-shaped bracketing portion or the first bracketing portion, the second L-shaped bracketing portion or the second bracketing portion, and the interior channel portion are extruded as a contiguous and unitary article of manufacture or (b) the first L-shaped bracketing portion or the first bracketing portion, the second L-shaped bracketing portion or the second bracketing portion, and the interior channel portion are extruded separately and bonded together to define the expandable foam corner protector;
wherein
(a) the interior channel portion is positioned between the first L-shaped bracketing portion and the second L-shaped bracketing portion, and wherein the interior channel portion is configured to define a generally right angle configured to overlie a corner of an inanimate object, and wherein the first L-shaped bracketing portion, the second L-shaped bracketing portion, and the interior portion define a U-shaped channel including the generally right angle of the interior channel portion; or
(b) the interior channel portion is positioned between the first bracketing portion and the second bracketing portion, in which each of the first bracketing portion and the second bracketing portion are folded into themselves and interlocked into respective L-shaped configurations via respective male and female connector portions, and wherein the interior channel portion is configured to define a generally right angle configured to overlie a corner of an inanimate object, and wherein the respective L-shaped configurations and the interior portion define a U-shaped channel including the generally right angle of the interior channel portion.

18. A method of protecting a corner of an inanimate object, comprising:
(i) providing an expandable foam corner protector according to claim 1;
(ii) expanding the interior channel portion of the expandable foam corner protector to an expanded state;
(vi) inserting the corner of the inanimate object into the expandable foam corner protector; and
(vii) allowing the first L-shaped bracketing portion and the second L-shaped bracketing portion to clamp onto opposing side surfaces of the inanimate object.

19. An expandable foam plank, comprising:
(i) a top edge and a bottom edge opposing the top edge, a first distance between the top edge and the bottom edge defines a width of the expandable foam plank in a Y-direction in an unexpanded state;
(ii) a first side edge and a second side edge opposing the first side edge, a second distance between the first side edge and the second side edge defines a length of the expandable foam plank in a X-direction;
(iii) a first surface and a second surface opposing the first surface, a third distance between the first surface and the second surface defining a thickness of the expandable foam plank in a Z-direction;
(iv) an interior channel portion extending from the first side edge to the second side edge, the interior channel portion including a plurality of arc-shaped cuts extending through the thickness of the expandable foam plank, and wherein at least a portion of the arc-shaped cuts are aligned along the X-direction and being free to expand to form expanded openings along the Y-direction in response to an external force applied to the expandable foam plank along the Y-direction; and
(iv) a first bracketing portion extending from the first side edge to the second side edge, and a second bracketing portion extending from the first side edge to the second side edge, wherein the interior channel portion is located between the first bracketing portion and the second bracketing portion;

wherein the expandable foam plank is biased towards the unexpanded state.

20. The expandable foam plank of claim 19, wherein the interior channel portion comprises from about 10% to about 80% of the width of the expandable foam plank, and the interior channel portion comprises a first buffer region located between the plurality of arc-shaped cuts and the first bracketing portion, and a second buffer region located between the plurality of arc-shaped cuts and the first bracketing portion, wherein the first buffer region and the second buffer region are each devoid of the plurality of arc-shaped cuts and each extend between the first side edge and the second side edge.

* * * * *

UNITED STATES PATENT AND TRADEMARK OFFICE
CERTIFICATE OF CORRECTION

Page 1 of 1

PATENT NO. : 12,145,787 B2
APPLICATION NO. : 18/131051
DATED : November 19, 2024
INVENTOR(S) : Samantha Fisher It is certified that error appears in the above-identified patent and that said Letters Patent is hereby corrected as shown below:

In the Claims

In Column 23, Claim 15, Line 56, "protector claim 14" should read -- protector of claim 14 --

In Column 24, Claim 16, Line 1, "protector claim 1" should read -- protector of claim 1 --

Signed and Sealed this
Twenty-sixth Day of August, 2025

Coke Morgan Stewart
*Acting Director of the United States Patent and Trademark Office*